US011022329B1

(12) United States Patent
Hurlebaus et al.

(10) Patent No.: US 11,022,329 B1
(45) Date of Patent: Jun. 1, 2021

(54) HUMIDITY CONTROL SYSTEM

(71) Applicant: Sub-Zero Group, Inc., Madison, WI (US)

(72) Inventors: Randy Wayne Hurlebaus, Waunakee, WI (US); Brent Records Keller, Stoughton, WI (US)

(73) Assignee: SUB-ZERO GROUP, INC., Madison, WI (US)

( * ) Notice: Subject to any disclaimer, the term of this patent is extended or adjusted under 35 U.S.C. 154(b) by 0 days.

(21) Appl. No.: 17/141,310

(22) Filed: Jan. 5, 2021

(51) Int. Cl.
*F24F 3/14* (2006.01)
*F24F 110/20* (2018.01)
*F24F 110/10* (2018.01)

(52) U.S. Cl.
CPC ......... *F24F 3/1405* (2013.01); *F24F 2110/10* (2018.01); *F24F 2110/20* (2018.01)

(58) Field of Classification Search
CPC ... F24F 3/1405; F24F 2110/20; F24F 2110/10
See application file for complete search history.

(56) References Cited

U.S. PATENT DOCUMENTS 7,895,851 B2   3/2011   Bianchi et al.
2015/0115047 A1*  4/2015  Okamoto ........... G05D 23/1917
                                                 236/1 E
2017/0074538 A1*  3/2017  Marchetti ............... F24F 11/30
2017/0276384 A1*  9/2017  Yuan ....................... F24F 11/83
2018/0031266 A1*  2/2018  Atchison ................. F24F 11/30
2019/0137156 A1   5/2019  Popli
2019/0293311 A1*  9/2019  Kohashi ................... F24F 3/14

FOREIGN PATENT DOCUMENTS

EP           2580550          8/2015

* cited by examiner

*Primary Examiner* — Henry T Crenshaw
(74) *Attorney, Agent, or Firm* — Bell & Manning, LLC

(57) ABSTRACT

A controller adjusts a humidity level within an enclosed space. When it is determined to cool the enclosed space, a compressor speed and a compressor run time are determined for a compressor. When it is determined to increase a humidity of the enclosed space, the compressor speed is decreased relative to the compressor speed determined for the compressor, the compressor run time is increased relative to the compressor run time determined for the compressor, a fan is turned on to direct air through an evaporator and into the enclosed space, and a flow of refrigerant is controlled through a coil of the evaporator based on the decreased compressor speed and the increased compressor run time. When it is determined to stop cooling, the compressor is turned off. The fan is turned off when it is determined to end an increase humidity state.

20 Claims, 20 Drawing Sheets

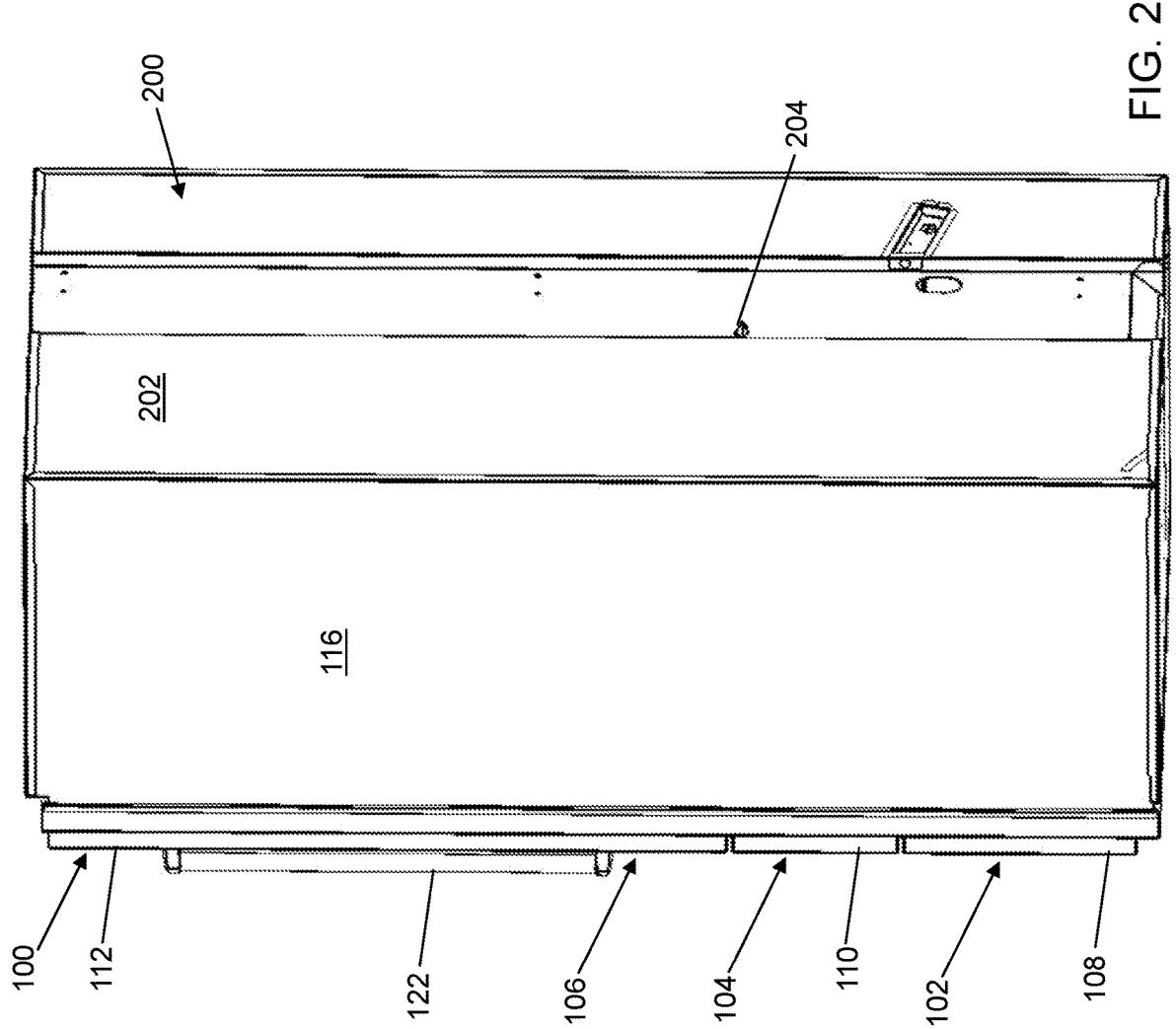

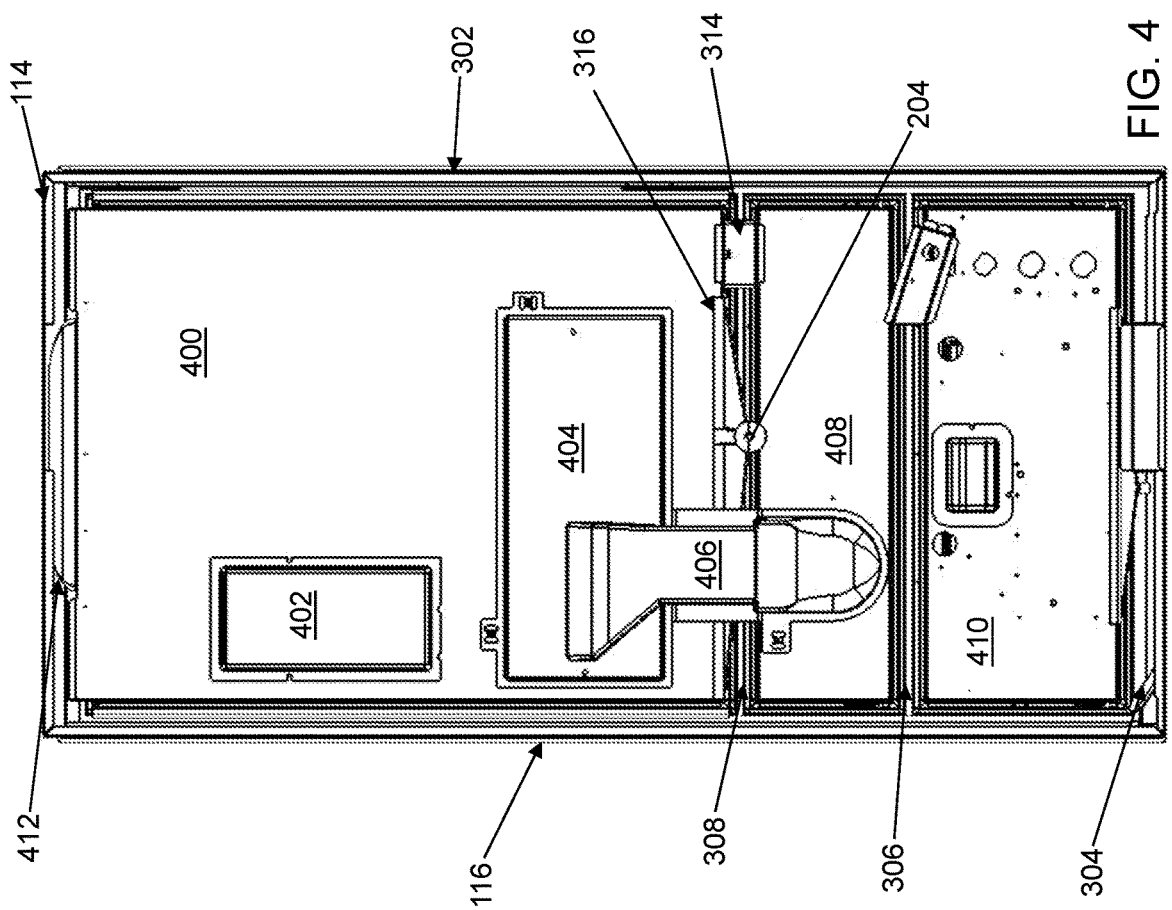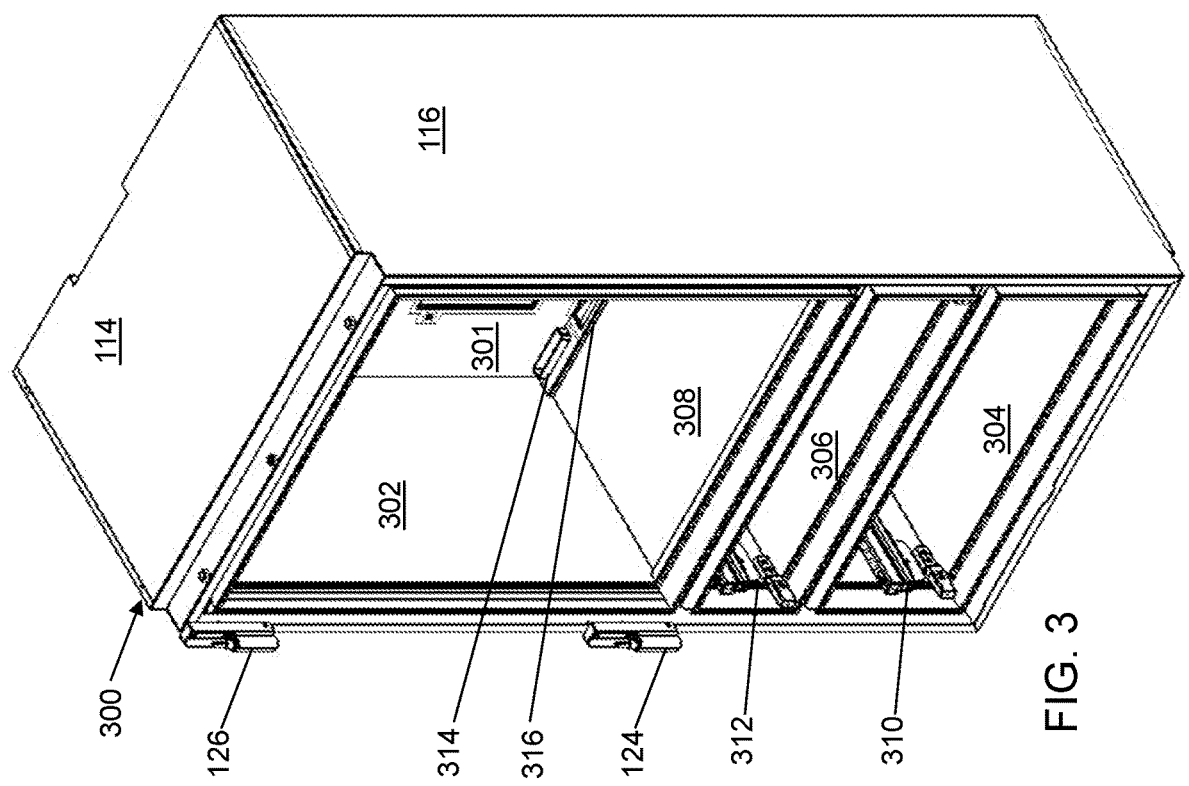

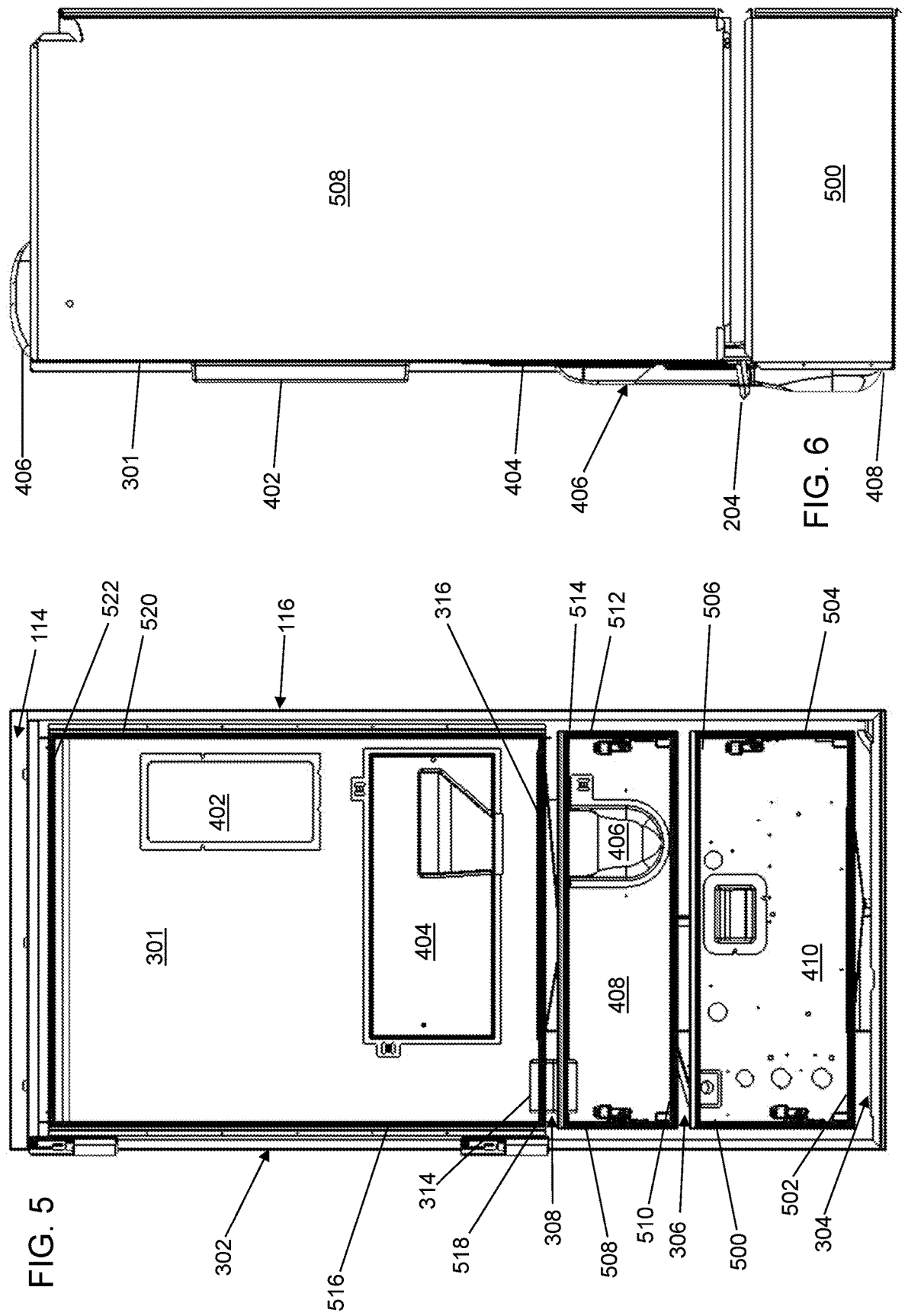

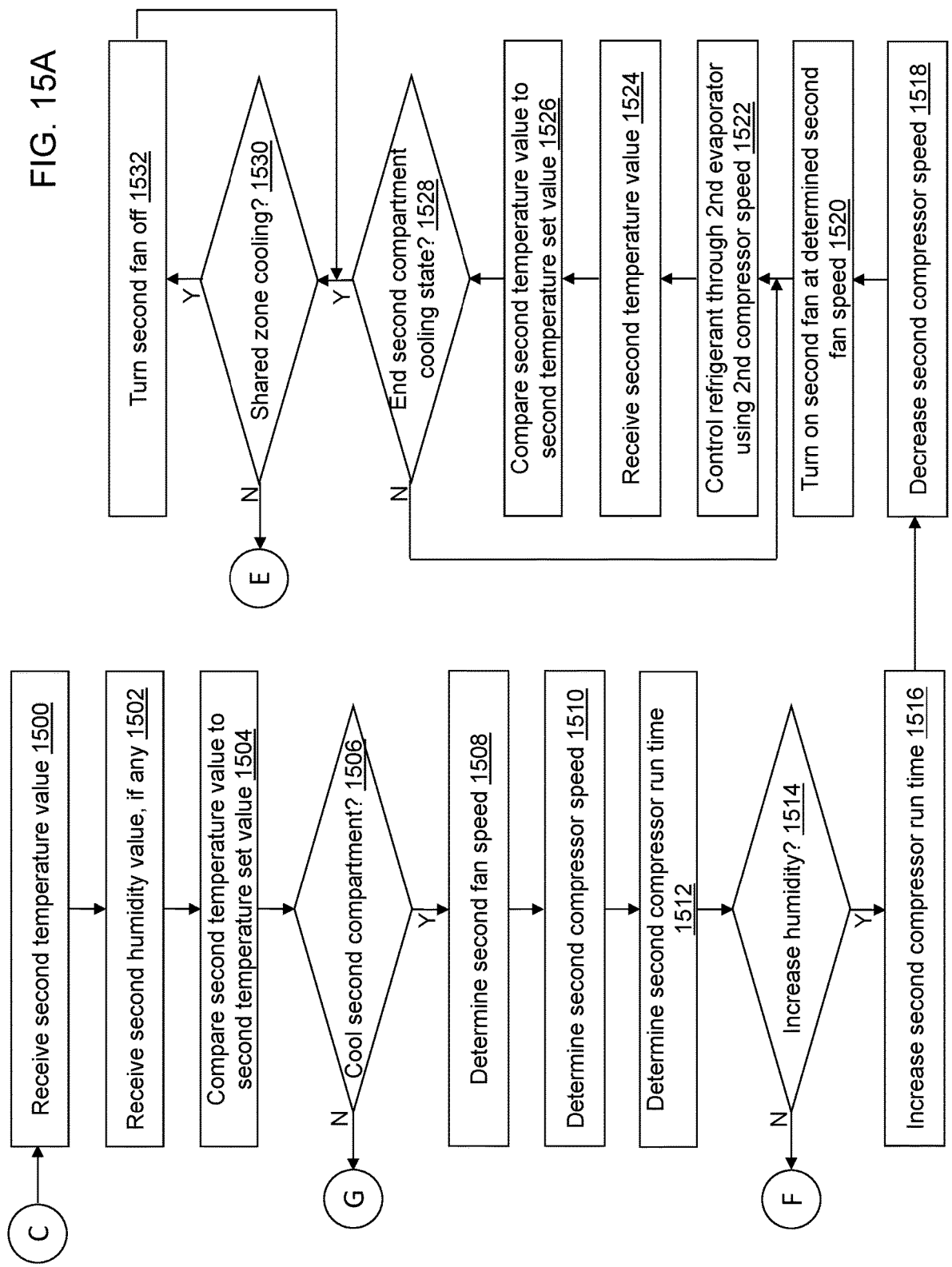

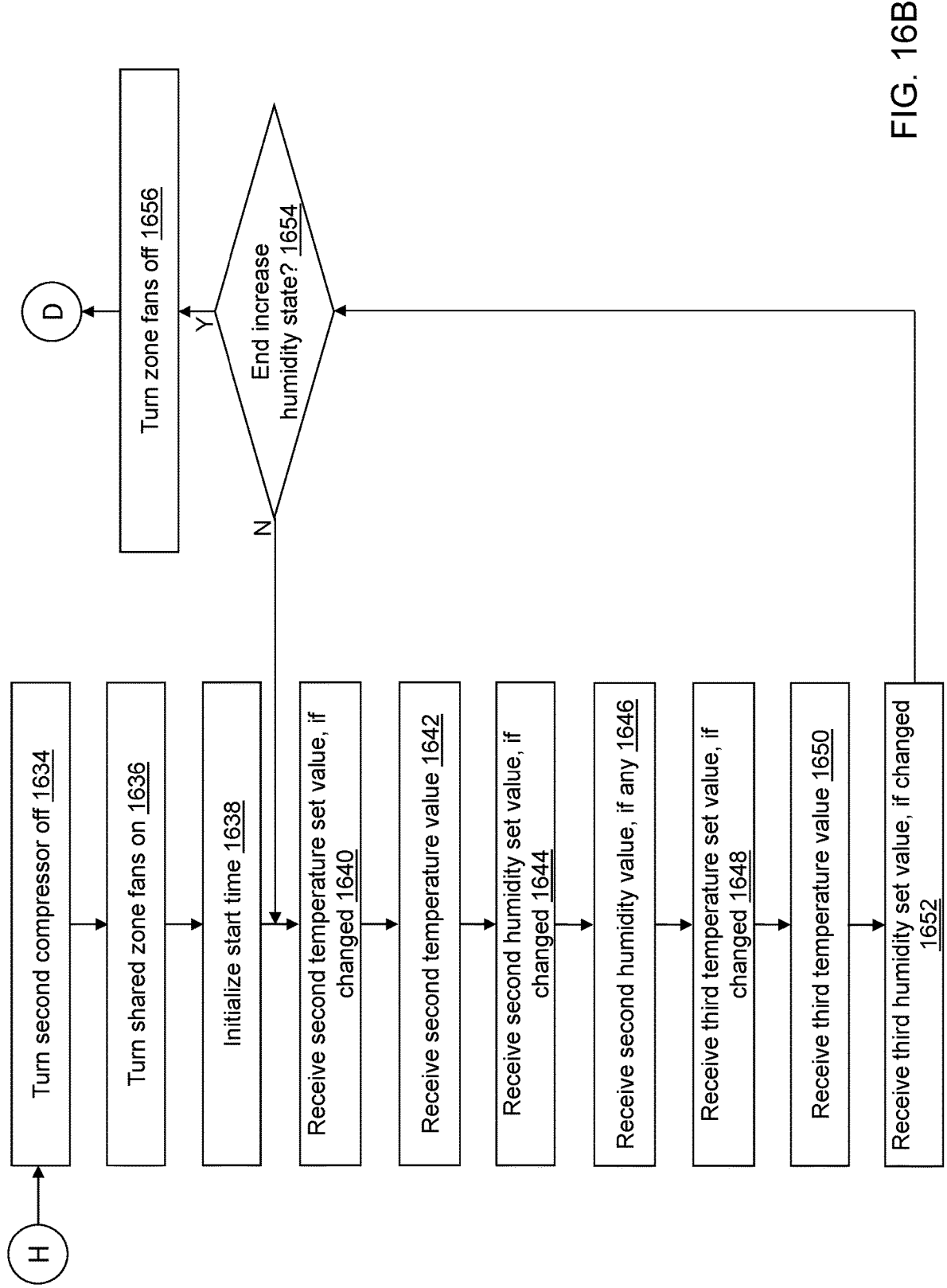

HUMIDITY CONTROL SYSTEM

BACKGROUND

Refrigerators can be divided into multiple cooling zones that can be controlled independently over the same or different temperature ranges. Humidity levels within each zone also effect food preservation based on the type of cooling zone and the food stored in each zone.

SUMMARY

In an example embodiment, a non-transitory computer-readable medium is provided having stored thereon computer-readable instructions that when executed by a controller, cause the controller to adjust a humidity level. A first temperature value is received from a first temperature sensor. The first temperature value is a measure of a first temperature within a first enclosed space. A first temperature set value is received for the first enclosed space. The first temperature set value is a desired first temperature value for the first enclosed space. A first humidity set value is received for the first enclosed space. The first humidity set value is a desired first humidity level for the first enclosed space. When it is determined to cool the first enclosed space based on a first comparison between the received first temperature value and the received first temperature set value, a first compressor speed is determined for a first compressor and a first compressor run time speed is determined for the first compressor. When it is determined to increase a humidity of the first enclosed space based on the received first humidity set value, the first compressor speed is decreased relative to the first compressor speed determined for the first compressor, the first compressor run time is increased relative to the first compressor run time determined for the first compressor, a first fan is controlled on to direct air through a first evaporator and into the first enclosed space, (A) a flow of refrigerant is controlled from the first compressor through a coil of the first evaporator based on the decreased first compressor speed and the increased first compressor run time, (B) a next first temperature value is received from the first temperature sensor, (C) when it is determined to stop cooling the first enclosed space based on a second comparison between the next first temperature value and the received first temperature set value, the first compressor is controlled to turn off, when to end an increase humidity state is determined, and the first fan is controlled to turn off when it is determined to end the increase humidity state, and (A) to (C) are repeated until it is determined to stop cooling the first enclosed space based on the second comparison.

In another example embodiment, a refrigerator is provided. The refrigerator includes, but is not limited to, the controller to adjust a humidity level.

In yet another example embodiment, a method of adjusting a humidity level is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 2 depicts a right, back, perspective view of the refrigerator of FIG. 1 in accordance with an illustrative embodiment.

FIG. 3 depicts a right, front, perspective view of the refrigerator of FIG. 1 with doors removed in accordance with an illustrative embodiment.

FIG. 4 depicts a back view of the refrigerator of FIG. 1 with a back wall portion removed in accordance with an illustrative embodiment.

FIG. 5 depicts a front view of the refrigerator of FIG. 1 with the doors removed in accordance with an illustrative embodiment.

FIG. 6 depicts a left-side view of the refrigerator of FIG. 1 with the doors removed in accordance with an illustrative embodiment.

FIGS. 14A to 14C, 15A to 15C, and 16A to 16C depict a flow diagram illustrating examples of operations performed by the refrigerator controller of FIG. 13 in accordance with an illustrative embodiment.

DETAILED DESCRIPTION

Figure 1:
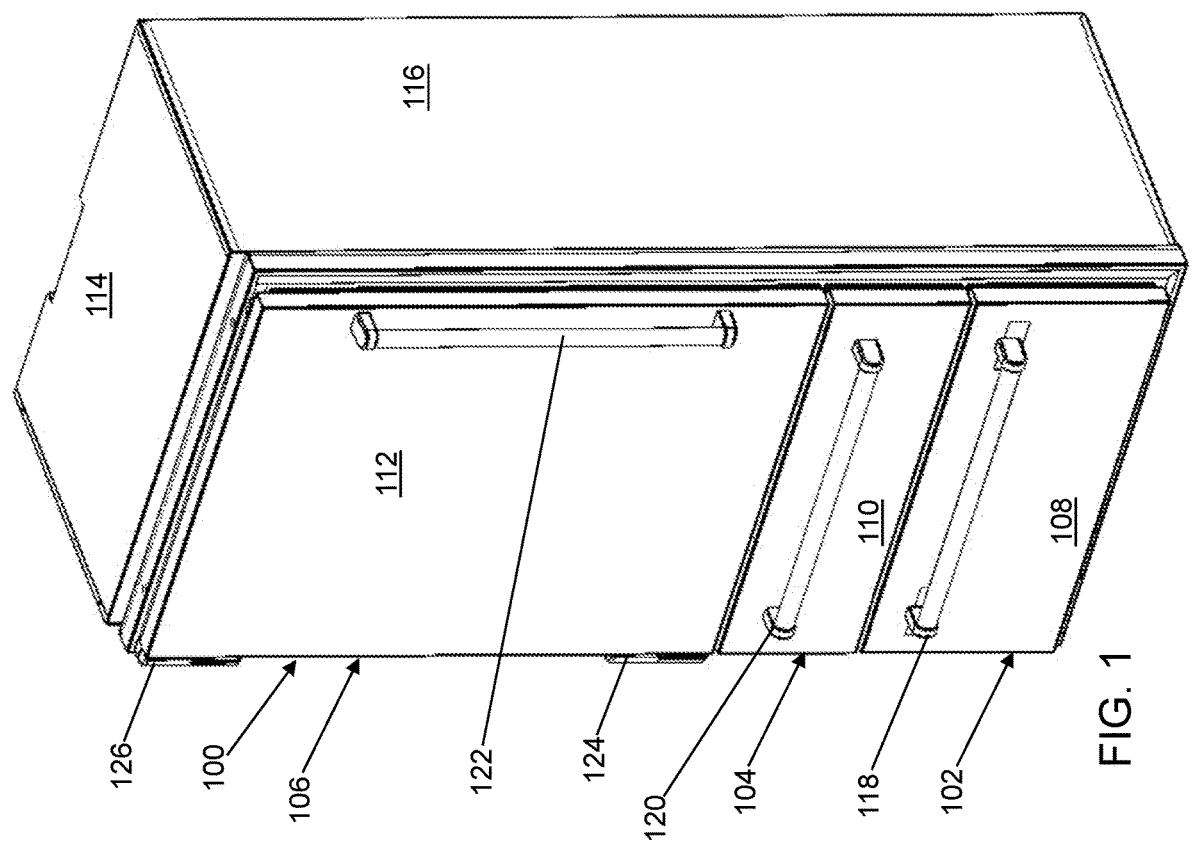
FIG. 1 depicts a right, front, perspective view of a refrigerator in accordance with an illustrative embodiment.

Referring to FIG. 1, a right, front, perspective view of a refrigerator 100 is shown in accordance with an illustrative embodiment. Referring to FIG. 2, a right, back, perspective view of refrigerator 100 is shown in accordance with an illustrative embodiment. Refrigerator 100 may include a plurality of compartments or cooling zones. For example, in the illustrative embodiment, refrigerator 100 includes a first compartment 102, a second compartment 104, and a third compartment 106. First compartment 102, second compartment 104, and third compartment 106 are stacked vertically with second compartment 104 above first compartment 102 and below third compartment 106.

Each compartment may provide a freezer zone or a refrigerated zone. For example, in the illustrative embodiment, first compartment 102 may be a freezer zone that is designed to operate below 32° Fahrenheit (° F.), for example, based on a selection using a first temperature control 1318 (shown referring to FIG. 13) and/or a first humidity control 1330 (shown referring to FIG. 13). Second compartment 104 and third compartment 106 may be refrigerated zones that are designed to operate between 34° F. and 42° F., for example, based on a selection using a second temperature control 1322 (shown referring to FIG. 13) and a third temperature control 1326 (shown referring to FIG. 13), respectively, and/or a second humidity control 1334 (shown referring to FIG. 13), and/or a third humidity control 1336 (shown referring to FIG. 13). In alternative embodiments, first temperature control 1318, second temperature control 1322, and/or third temperature control 1326 may be set to any temperature or within any temperature range, and first humidity control 1330, second humidity control 1334, and/or third humidity control 1336 may be set to any humidity level or within any range of humidity levels.

As understood by a person of skill in the art, a temperature control allows a user of the refrigerator 100 to set a desired temperature value to maintain in one or more zones of refrigerator 100. The temperature control may be implemented using a dial, knob, touch display, switch, etc. to allow the user to increase or decrease the desired temperature value or to enter a specific desired temperature value. As understood by a person of skill in the art, a humidity control allows a user of the refrigerator 100 to set a desired humidity value to maintain in one or more zones of refrigerator 100. The humidity control may be implemented using a dial, knob, touch display, switch, etc. to allow the user to increase or decrease the desired humidity value or to enter a specific desired humidity value.

In general, a temperature and/or humidity of the refrigerated zone is maintained at an adequate temperature and/or humidity to preserve fresh food and a temperature and/or humidity of the freezer zone is maintained at an adequate temperature and/or humidity to maintain food stored therein in a frozen state. In alternative embodiments, refrigerator 100 may include a fewer or a greater number of compartments arranged vertically and/or horizontally with respect to each other. For example, refrigerator 100 may include compartments to the right of the illustrated compartments. A wall that separates a pair of compartments may or may not be insulated.

Each compartment of the plurality of compartments may include a plurality of walls, a compartment access structure configured to provide access to an enclosed space defined by the plurality of walls and the compartment access structure, and a temperature sensor configured to measure a temperature value of air in the enclosed space or a portion of the enclosed space and to send the measured temperature value to a refrigerator controller 1300 (shown referring to FIG. 13), and a humidity sensor configured to measure a humidity value of air in the enclosed space or a portion of the enclosed space and to send the measured humidity value to refrigerator controller 1300. For example, a first temperature sensor 1316 (shown referring to FIG. 13) may measure a current temperature within first compartment 102; a second temperature sensor 1320 (shown referring to FIG. 13) may measure a current temperature within second compartment 104; and a third temperature sensor 1324 (shown referring to FIG. 13) may measure a current temperature within third compartment 106. One or more compartments may include a plurality of temperature sensors to measure a temperature at various locations with the compartment. For example, a temperature sensor may measure a temperature adjacent a drawer and another temperature sensor may measure a temperature adjacent a shelf. For illustration, first temperature sensor 1316, second temperature sensor 1320, and third temperature sensor 1324 may be a thermistor electrically connected either by wire or wirelessly to refrigerator controller 1300 to provide the measured temperature periodically, continuously, when requested, etc.

Similarly, a first humidity sensor 1328 (shown referring to FIG. 13) may measure a current humidity within first compartment 102; a second humidity sensor 1332 (shown referring to FIG. 13) may measure a current humidity within second compartment 104; and a third humidity sensor may measure a current humidity within third compartment 106. One or more compartments may include a plurality of humidity sensors to measure a humidity at various locations with the compartment. For example, a humidity sensor may measure a humidity adjacent a drawer and another humidity sensor may measure a humidity adjacent a shelf. For illustration, first humidity sensor 1328, second humidity sensor 1332, and the third humidity sensor may be a hygrometer electrically connected either by wire or wirelessly to refrigerator controller 1300 to provide the measured humidity periodically, continuously, when requested, etc.

Refrigerator controller 1300 controls a flow of refrigerant through each refrigeration system of refrigerator 100 where a refrigeration system cools air provided to one or more of the plurality of compartments. Refrigerator 100 may include one or more refrigeration systems. For illustration, a refrigeration system may include a compressor, a condenser, an expansion valve, a dryer, and/or an evaporator through which the refrigerant flows as well as various motors that control operation of the refrigeration system components as known to a person of skill in the art. An air circulation system that includes a fan, an air duct, and/or a return duct may be associated with each compartment to provide cooled air from the associated evaporator to the associated space and to return air from the associated space to the associated evaporator to maintain the air in the associated space at the temperature and/or humidity level selected using the associated temperature and/or humidity control. Two or more compartments of the plurality of compartments may share portions of a refrigeration system and an air circulation system and may be referred to herein as shared zones.

First compartment 102 may include a first compartment access structure 108 that is a first drawer panel. A first handle 118 is mounted to first compartment access structure 108 to slide a first drawer open for access to a first enclosed space defined by first compartment 102. First compartment access structure 108 may include one or more gaskets to seal the first enclosed space from external air when first compartment access structure 108 is closed. First compartment 102 may include a plurality of drawers that may be stacked vertically and/or horizontally.

Second compartment 104 may include a second compartment access structure 110 that is a second drawer panel. A second handle 120 is mounted to second compartment access structure 110 to slide a second drawer open for access to a second enclosed space defined by second compartment 104. Second compartment access structure 110 may include one or more gaskets to seal the second enclosed space from external air when second compartment access structure 110 is closed. Second compartment 104 may include a plurality of drawers that may be stacked vertically and/or horizontally.

Third compartment 106 may include a third compartment access structure 112 that is a door. A third handle 122 is mounted to third compartment access structure 110 and is used to open the door by rotating it about a first hinge 124 and a second hinge 126 for access to a third enclosed space defined by third compartment 106. Third compartment access structure 112 may be rotatable in either direction about a horizontal axis or a vertical axis defined by first hinge 124 and second hinge 126. In alternative embodiments, the door may be mounted to a refrigerator body 300

(shown referring to FIG. 3) of refrigerator 100 using a greater or a fewer number of hinges of various types. Third compartment access structure 112 may include one or more gaskets to seal the third enclosed space from external air when third compartment access structure 112 is closed.

Referring to FIGS. 1 to 3, refrigerator body 300 may include a top wall 114, a right-side wall 116, a left-side wall 302 (shown referring to FIG. 3), a bottom wall 304 (shown referring to FIG. 3), and a back wall 200 (shown referring to FIG. 2). Each wall may be formed of one or more plates. For each wall comprised of a plurality of plates, the plurality of plates is mounted to each other using various fasteners or fastening methods with electrical wiring, ducts, tubing, sensors, and/or insulation possibly mounted between the plurality of plates. For example, back wall 200 includes an exterior plate 202, a middle plate 301, a first compartment back plate 410 (shown referring to FIG. 4), a second compartment back plate 408 (shown referring to FIG. 4), and a third compartment back plate 400 (shown referring to FIG. 4).

Each compartment of the plurality of compartments may include zero or more shelves, drawers, or other receptacles mounted therein. Zero or more receptacles further may be mounted to each compartment access structure. For example, first compartment 102 and second compartment 104 may include drawer walls that form a receptacle mounted to first compartment access structure 108 and to second compartment access structure 110, respectively, that slide outward with first compartment access structure 108 and with second compartment access structure 110, respectively. Third compartment 106 may include shelves mounted to third compartment access structure 112 that open with third compartment access structure 112 as well as shelves and/or drawers mounted within the third enclosed space. The components of refrigerator 100 including refrigerator body 300 may be formed of one or more materials, such as metal, glass, and/or plastic having a sufficient strength and rigidity and aesthetic value to provide the illustrated and/or described function. For example, the one or more shelves, drawers, or other receptacles may be formed of one or more materials, such as metals, glass, and/or plastics having a sufficient strength and rigidity to support food items or other items stored in refrigerator 100 while providing an attractive appearance.

In the illustrative embodiment, first compartment access structure 108 provides access to first compartment 102 defined by bottom wall 304, right-side wall 116, left-side wall 302, back wall 200, and a first divider wall 306; second compartment access structure 110 provides access to second compartment 104 defined by first divider wall 306, right-side wall 116, left-side wall 302, back wall 200, and a second divider wall 308; and third compartment access structure 112 provides access to third compartment 106 defined by second divider wall 308, right-side wall 116, left-side wall 302, back wall 200, and top wall 114. Bottom wall 304, right-side wall 116, left-side wall 302, back wall 200, and first divider wall 306 define the first enclosed space of first compartment 102. First divider wall 306, right-side wall 116, left-side wall 302, back wall 200, and second divider wall 308 define the second enclosed space of second compartment 104. Second divider wall 308, right-side wall 116, left-side wall 302, back wall 200, and top wall 114 define the third enclosed space of third compartment 106.

First compartment 102 further includes a left-side sliding bracket 310 and a right-side sliding bracket (not shown) on which the first drawer is mounted to slide in and out to provide access to the first enclosed space. Second compartment 104 further includes a left-side sliding bracket 312 and a right-side sliding bracket (not shown) on which the second drawer is mounted to slide in and out to provide access to the second enclosed space. Of course, in alternative embodiments, a door may provide access to the first enclosed space and/or the second enclosed space.

Though shown in the illustrative embodiment as forming a generally rectangular shaped enclosure with generally rectangular shaped components, refrigerator 100 may form any shaped enclosure including other polygons as well as circular or elliptical enclosures. As a result, each compartment access structure and the walls forming refrigerator body 300 and each compartment may have any shape including other polygons as well as circular or elliptical shapes. The refrigeration system components such as the compressor, the condenser, the evaporator, the dryer, etc. may be mounted to various walls of refrigerator body 300 either within the walls, on an exterior of the walls relative to refrigerator body 300, and/or on an interior of the walls relative to refrigerator body 300.

Use of directional terms, such as top, bottom, right, left, front, back, etc. are merely intended to facilitate reference to the various surfaces and elements of the described structures relative to the orientations shown in the drawings and are not intended to be limiting in any manner. For consistency, the components of refrigerator 100 are labeled such that the compartment access structure(s) define a front of refrigerator 100.

As used in this disclosure, the term "mount" is intended to define a structural connection between two or more elements and includes join, unite, connect, couple, associate, insert, hang, hold, affix, attach, fasten, bind, paste, secure, bolt, screw, rivet, solder, weld, glue, adhere, form over, layer, and other similar terms. The phrases "mounted on" and "mounted to" include any interior or exterior portion of the elements referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements.

With reference to FIG. 4, a back view of refrigerator body 300 is shown with exterior plate 202 and middle plate 301 of back wall 200 removed in accordance with an illustrative embodiment. With reference to FIG. 5, a front view of refrigerator body 300 is shown with third compartment back plate 400 of back wall 200 removed in accordance with an illustrative embodiment. With reference to FIG. 6, a left-side view of refrigerator body 300 is shown with exterior plate 202 and third compartment back plate 400 of back wall 200 removed in accordance with an illustrative embodiment.

In the illustrative embodiment, an air filter mounting plate 402, an evaporator mounting plate 404, and a second compartment air duct 406 are mounted to middle plate 301 and/or third compartment back plate 400. An air filter housing is mounted to air filter mounting plate 402. An air filter may be mounted within the air filter housing to filter air passing therethrough.

Referring to FIGS. 4 and 5, the first enclosed space of first compartment 102 is defined by a first compartment left-side plate 500, a first compartment bottom plate 502, a first compartment right-side plate 504, a first compartment top plate 506, first compartment back plate 410, and first compartment access structure 108. In the illustrative embodiment, first compartment 102 is cooled by a first refrigeration system that includes a first evaporator (not shown), a first compressor 1344 (shown referring to FIG. 13), etc. through a first air circulation system (not shown) that includes a first fan 1342 (shown referring to FIG. 13).

The second enclosed space of second compartment 104 is defined by a second compartment left-side plate 508, a second compartment bottom plate 510, a second compartment right-side plate 512, a second compartment top plate 514, second compartment back plate 408, and second compartment access structure 110. The third enclosed space of third compartment 106 is defined by a third compartment left-side plate 516, a third compartment bottom plate 518, a third compartment right-side plate 520, a third compartment top plate 522, third compartment back plate 400, and third compartment access structure 110.

Figure 7:
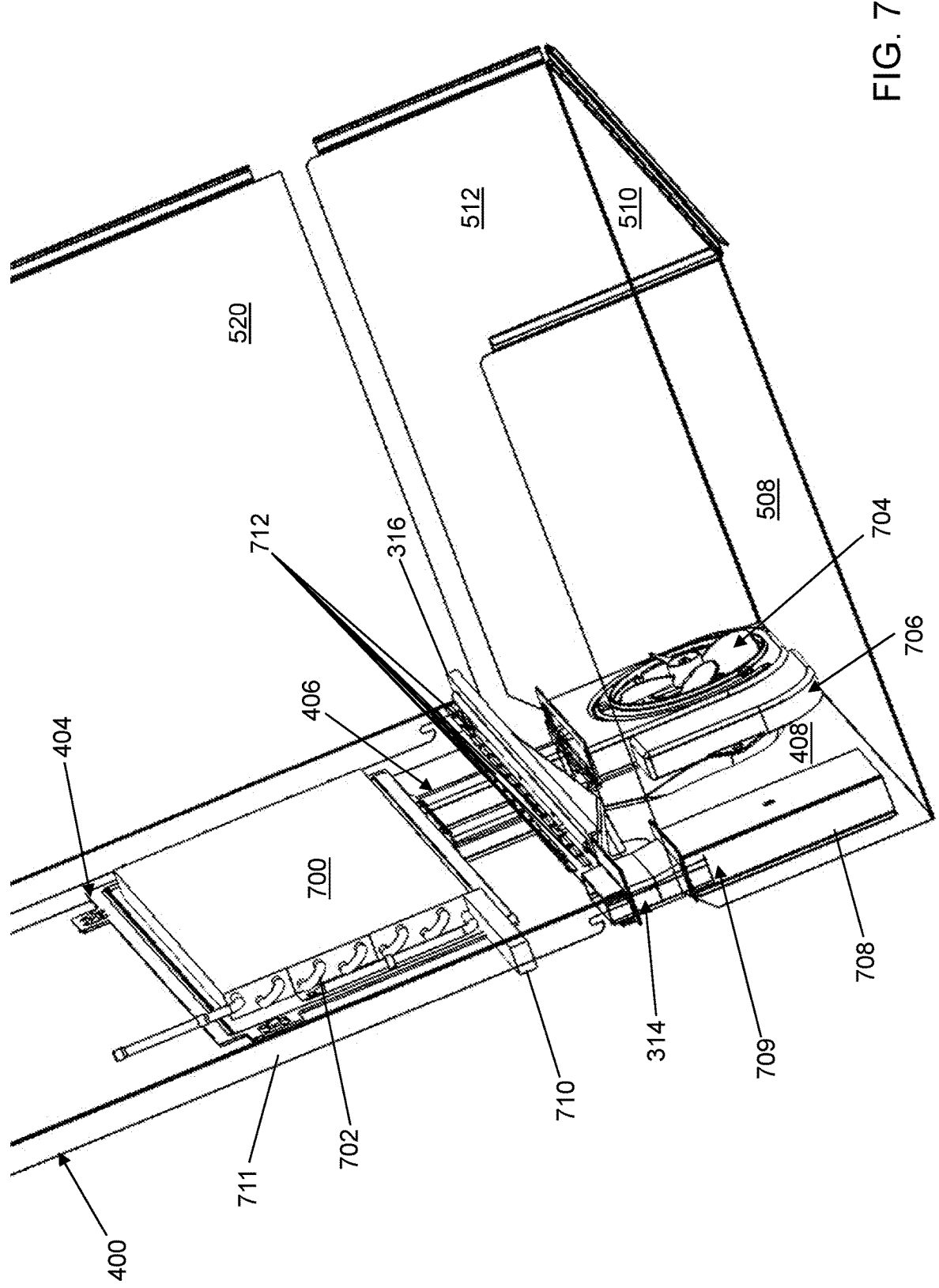
FIG. 7 depicts a left, front perspective view of a first portion of the refrigerator of FIG. 1 in accordance with an illustrative embodiment.
Figure 9:
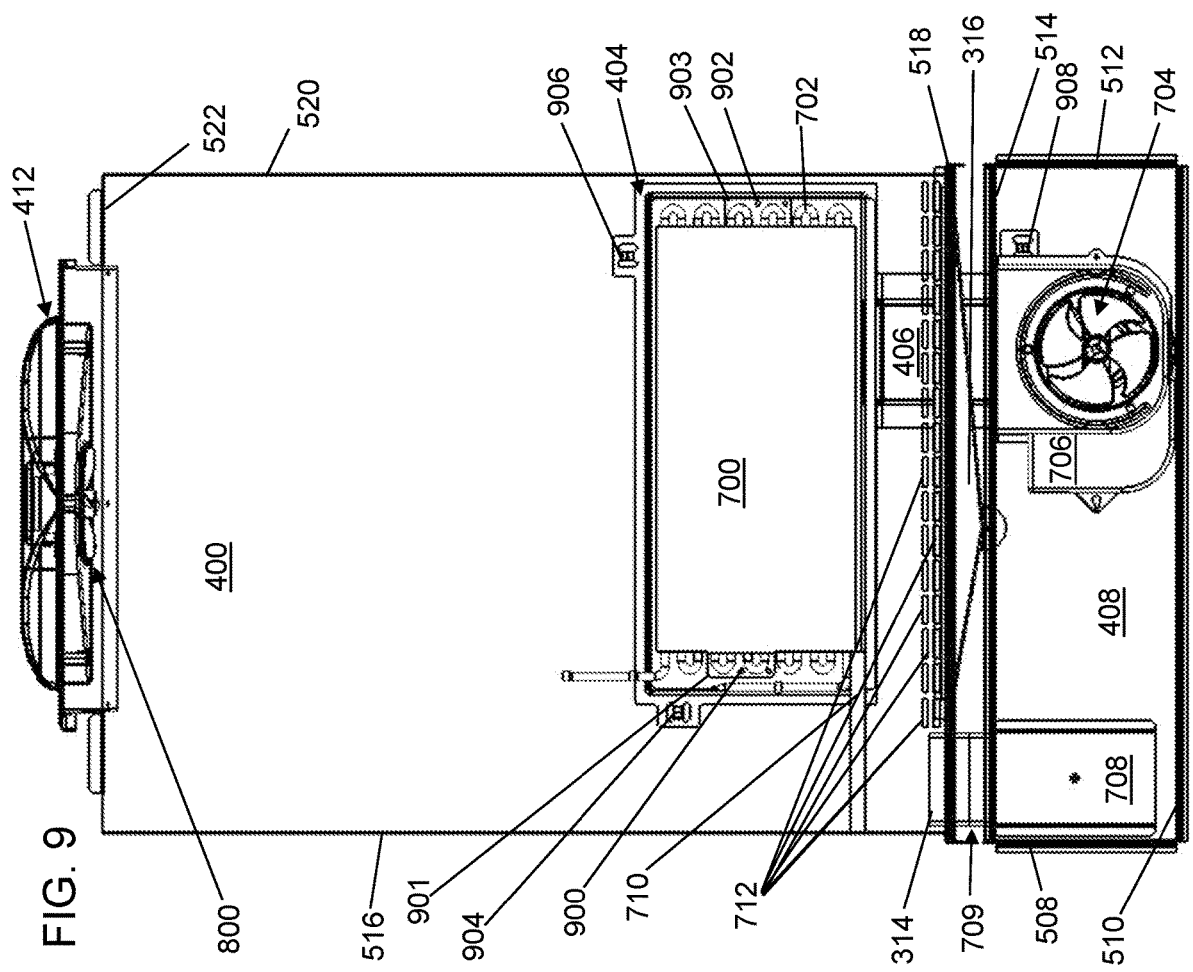
FIG. 9 depicts a front view of the second portion of FIG. 8 in accordance with an illustrative embodiment.
Figure 8:
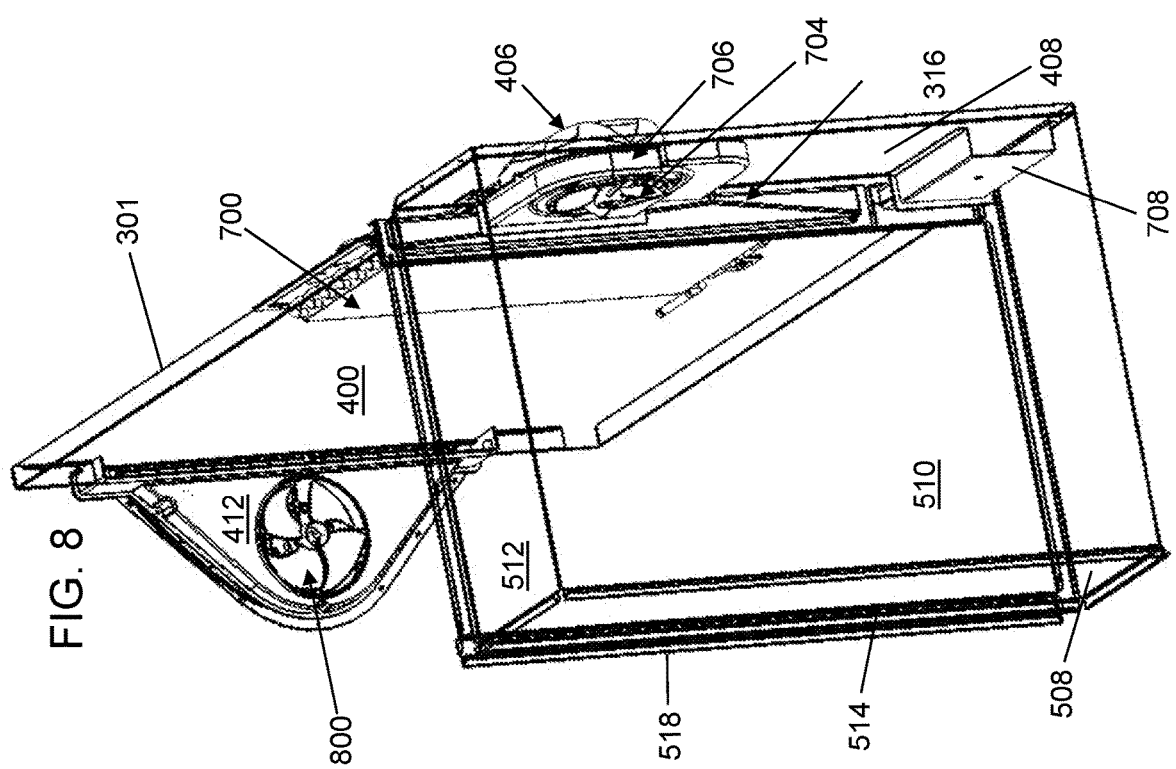
FIG. 8 depicts a right, bottom perspective view of a second portion of the refrigerator of FIG. 1 in accordance with an illustrative embodiment.
Figure 11:
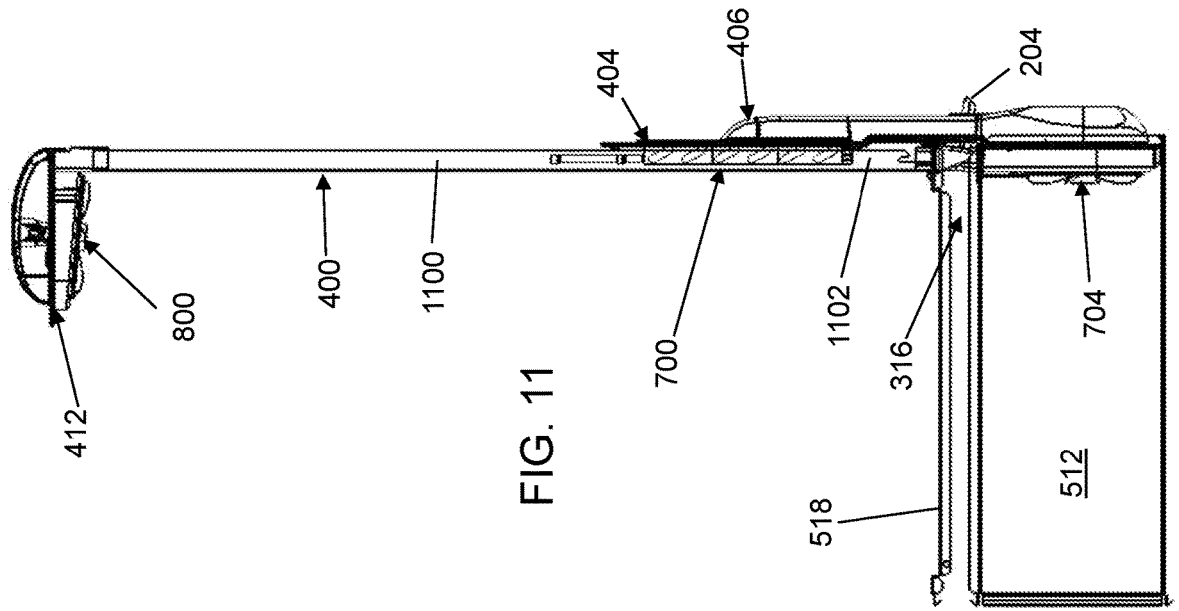
FIG. 11 depicts a right-side view of the second portion of FIG. 8 in accordance with an illustrative embodiment.
Figure 10:
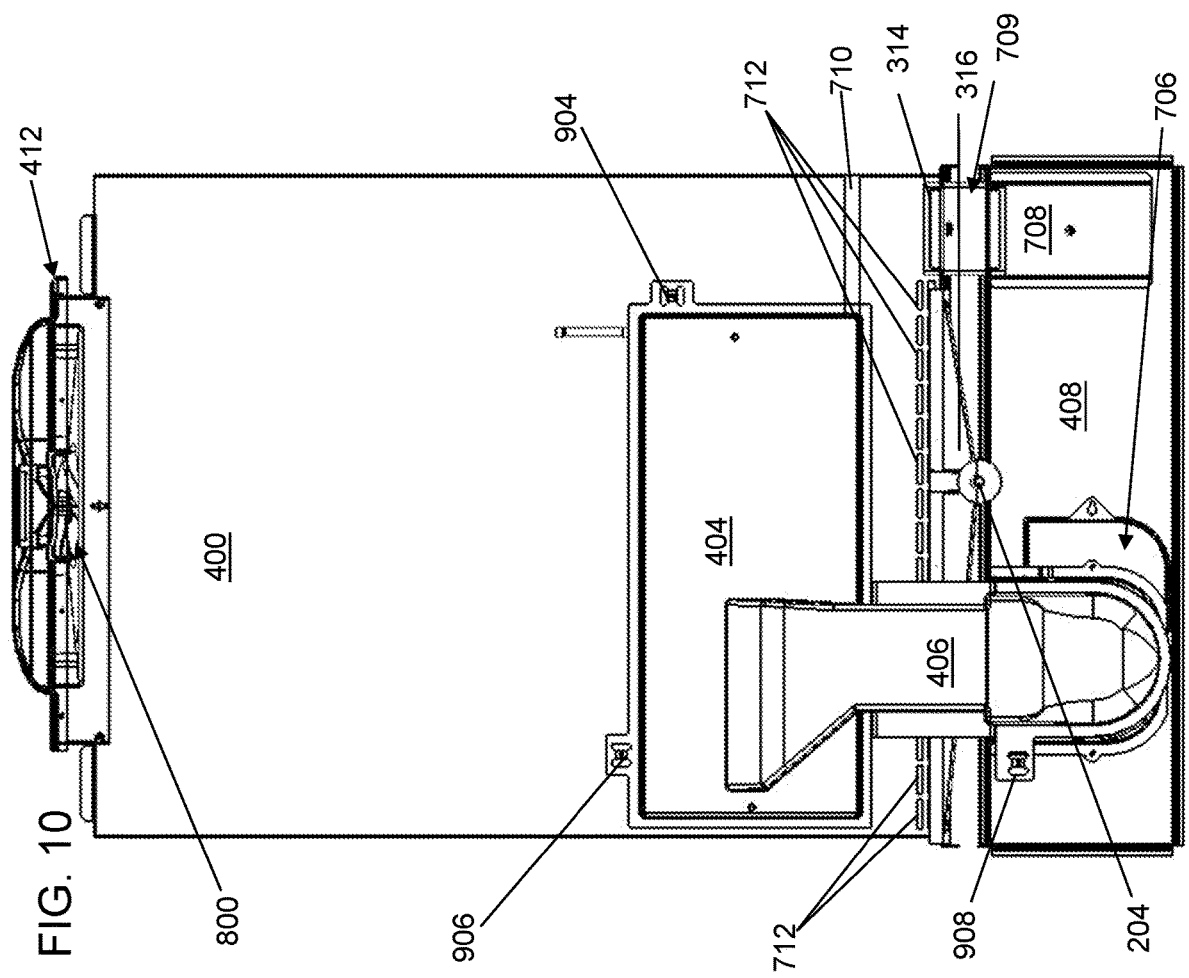
FIG. 10 depicts a back view of the second portion of FIG. 8 in accordance with an illustrative embodiment.

With reference to FIG. 7, a left perspective view of interior components related to circulating cooled air to second compartment 104 are shown in accordance with an illustrative embodiment. With reference to FIG. 8, a bottom perspective view of interior components related to circulating cooled air to second compartment 104 and to third compartment 106 are shown in accordance with an illustrative embodiment. With reference to FIG. 9, a front view of interior components related to circulating cooled air to second compartment 104 and to third compartment 106 are shown in accordance with an illustrative embodiment. With reference to FIG. 10, a back view of interior components related to circulating cooled air to second compartment 104 and to third compartment 106 are shown in accordance with an illustrative embodiment. With reference to FIG. 11, a right-side view of interior components related to circulating cooled air to second compartment 104 and to third compartment 106 are shown in accordance with an illustrative embodiment. Second compartment left-side plate 508, second compartment bottom plate 510, second compartment right-side plate 512, second compartment top plate 514, second compartment back plate 408, third compartment left-side plate 516, third compartment bottom plate 518, third compartment right-side plate 520, third compartment top plate 522, and third compartment back plate 400 are either transparent or removed in FIGS. 7 to 11 to better illustrate the components.

In the illustrative embodiment, second compartment 104 and third compartment 106 are cooled by a second refrigeration system that includes a second evaporator 700, a second compressor 1346 (shown referring to FIG. 13), a second fan 704, a third fan 800 (shown referring to FIG. 8), etc. Second fan 704, third fan 800, and/or first fan 1342 may be variable speed fans that can be controlled to operate at different speeds such as high, medium, or low. There may a greater or a fewer number of alternative fan speeds. First compressor 1344 and second compressor 1346 may be variable speed compressors that can be controlled to operate at different speeds such as high, medium, or low. There may a greater or a fewer number of alternative compressor speeds. Second evaporator 700 is mounted to evaporator mounting plate 404 between middle plate 301 and third compartment back plate 400. In the illustrative embodiment, air flows upward through and around second evaporator 700 and is cooled by refrigerant that flows through a second evaporator coil 702 of second evaporator 700. In the illustrative embodiment, evaporator mounting plate 404 is mounted to middle plate 301.

The refrigerant is circulated through second evaporator coil 702 of second evaporator 700, second compressor 1346, a second condenser, an expansion valve, etc. to cool second compartment 104 and third compartment 106. In an illustrative embodiment, the second refrigeration system is separate from the first refrigeration system.

Second compartment air duct 406 may be mounted between second evaporator 700 and the second enclosed space of second compartment 104. Second compartment air duct 406 may be mounted to middle plate 301, third compartment back plate 400, and/or evaporator mounting plate 404 at a first end and to second compartment back plate 408 at a second end. Air flows from an inlet side of second evaporator 700 that is below second evaporator 700 to an outlet side of second evaporator 700 that is above second evaporator 700 through operation of third fan 800 that directs air from second evaporator 700 into second compartment 104. The space between middle plate 301 and third compartment back plate 400 that is above second evaporator 700 defines a third compartment air duct 1100 (shown referring to FIG. 11). The space between middle plate 301 and third compartment back plate 400 that is below second evaporator 700 defines a third compartment return duct 1102 (shown referring to FIG. 11). In the illustrative embodiment, third compartment air duct 1100 and third compartment return duct 1102 form a continuous duct within which second evaporator 700 is mounted. Third fan 800 is mounted within a third fan housing 412 mounted to or within top wall 114 though third fan housing 412 may be mounted to a different wall of refrigerator body 300 and/or within third compartment air duct 1100 in alternative embodiments.

A second air circulation system for the second enclosed space may include second compartment air duct 406, second fan 704, a second compartment return duct wall 708, a second compartment return duct wall 314, an air flow diverter wall 710, and third compartment return duct 1102. Second compartment return duct wall 708 and second compartment return duct wall 314 define a second compartment return duct 709. Second compartment return duct wall 708 forms a first aperture and a second aperture. Second compartment return duct wall 314 forms a third aperture and a fourth aperture. The first aperture of second compartment return duct wall 708 is located in the second enclosed space as shown referring to FIG. 8. The fourth aperture of second compartment return duct wall 314 is located in third compartment return duct 1102 between middle plate 301 and third compartment back plate 400 below second evaporator 700. The second aperture of second compartment return duct wall 708 is mounted to the third aperture of second compartment return duct wall 314 to form second compartment return duct 709. Of course, second compartment return duct 709 may be formed of a fewer or a greater number of duct walls having various shapes and sizes sufficient to circulate a desired amount of air from the second enclosed space towards second evaporator 700 from the second enclosed space.

Air flow diverter wall 710 is mounted between middle plate 301 and third compartment back plate 400 and above the fourth aperture of second compartment return duct wall 314 to receive and redirect air from second compartment return duct 709 towards the inlet side of second evaporator 700. In the illustrative embodiment, air flow diverter wall 710 extends between a left-side of second evaporator 700 and a left-side plate 711 of third compartment back plate 400 to block and redirect all of the air from second compartment return duct 709.

In the illustrative embodiment, second compartment return duct 709 is positioned adjacent second compartment back plate 408. Second fan 704 is mounted within a second fan housing 706 mounted to or within second compartment air duct 406 and/or second compartment back plate 408. The first aperture of second compartment return duct wall 708 is located at an opposite end of second compartment back plate 408 relative to second fan 704. Second fan 704 may be selected based on a direction of desired air flow into the second enclosed space and a size of the second enclosed space. For example, second fan 704 may be an axial flow fan such as that shown in the illustrative embodiment, a centrifugal fan, a cross-flow fan, etc. A motor (not shown) for second fan 704 may also be mounted within second fan housing 706. Second fan 704 may be mounted to a different wall of refrigerator body 300 in alternative embodiments.

Second temperature sensor 1320 may be mounted in the second enclosed space to measure a first temperature of the air in the second enclosed space and to send the measured first temperature to refrigerator controller 1300. In an illustrative embodiment, second temperature sensor 1320 may be mounted within or adjacent the second enclosed space generally opposite second fan 704. Second humidity sensor 1320 may be mounted in the second enclosed space to measure a first humidity of the air in the second enclosed space and to send the measured first humidity to refrigerator controller 1300. In an illustrative embodiment, second humidity sensor 1320 may be mounted within or adjacent the second enclosed space generally opposite second fan 704.

A third air circulation system for the third enclosed space may include third compartment air duct 1100, third fan 800, third compartment return duct 1102, and a plurality of vent aperture walls 712 that define a plurality of vents formed through third compartment back plate 400. The plurality of vents is positioned between the third enclosed space and third compartment return duct 1102. The plurality of vents is located at an opposite end of third compartment back plate 400 relative to third fan 800. Third fan 800 may be selected based on a direction of desired air flow into the third enclosed space and a size of the third enclosed space. For example, third fan 800 may be an axial flow fan such as that shown in the illustrative embodiment, a centrifugal fan, a cross-flow fan, etc. A motor (not shown) for third fan 800 may also be mounted within third fan housing 412.

An evaporator condensation tray 316 is mounted below second evaporator 700 to catch any liquid and route it to an exterior of refrigerator body 300 through a drain port 204.

Third temperature sensor 1324 may be mounted in the third enclosed space to measure a second temperature of the air in the third enclosed space and to send the measured second temperature to refrigerator controller 1300. In an illustrative embodiment, third temperature sensor 1324 may be mounted within or adjacent the third enclosed space in a location chosen for optimal control of the temperature. Again, a plurality of temperature sensors may be mounted in the third enclosed space to measure the temperature in various portions of the third enclosed space.

The third humidity sensor may be mounted in the third enclosed space to measure a second humidity of the air in the third enclosed space and to send the measured second humidity to refrigerator controller 1300. In an illustrative embodiment, the third humidity sensor may be mounted within or adjacent the third enclosed space in a location chosen for optimal control of the humidity.

The position and orientation of various components of the second refrigeration system, the second air circulation system, and the third air circulation system may be moved and/or reoriented based on the arrangement of second compartment 104 and third compartment 106 relative to each other. Additionally, various components of the second refrigeration system, the second air circulation system, and the third air circulation system may be mounted in a different wall of refrigerator 300 or mounted in different walls instead of mounted in the same wall. For example, second evaporator 700 may be positioned adjacent second compartment 104 instead of third compartment 106 or between second compartment 104 and third compartment 106. Second evaporator 700 further may be mounted in left-side wall 302 or right-side wall 116 instead of back wall 200.

Figure 12:
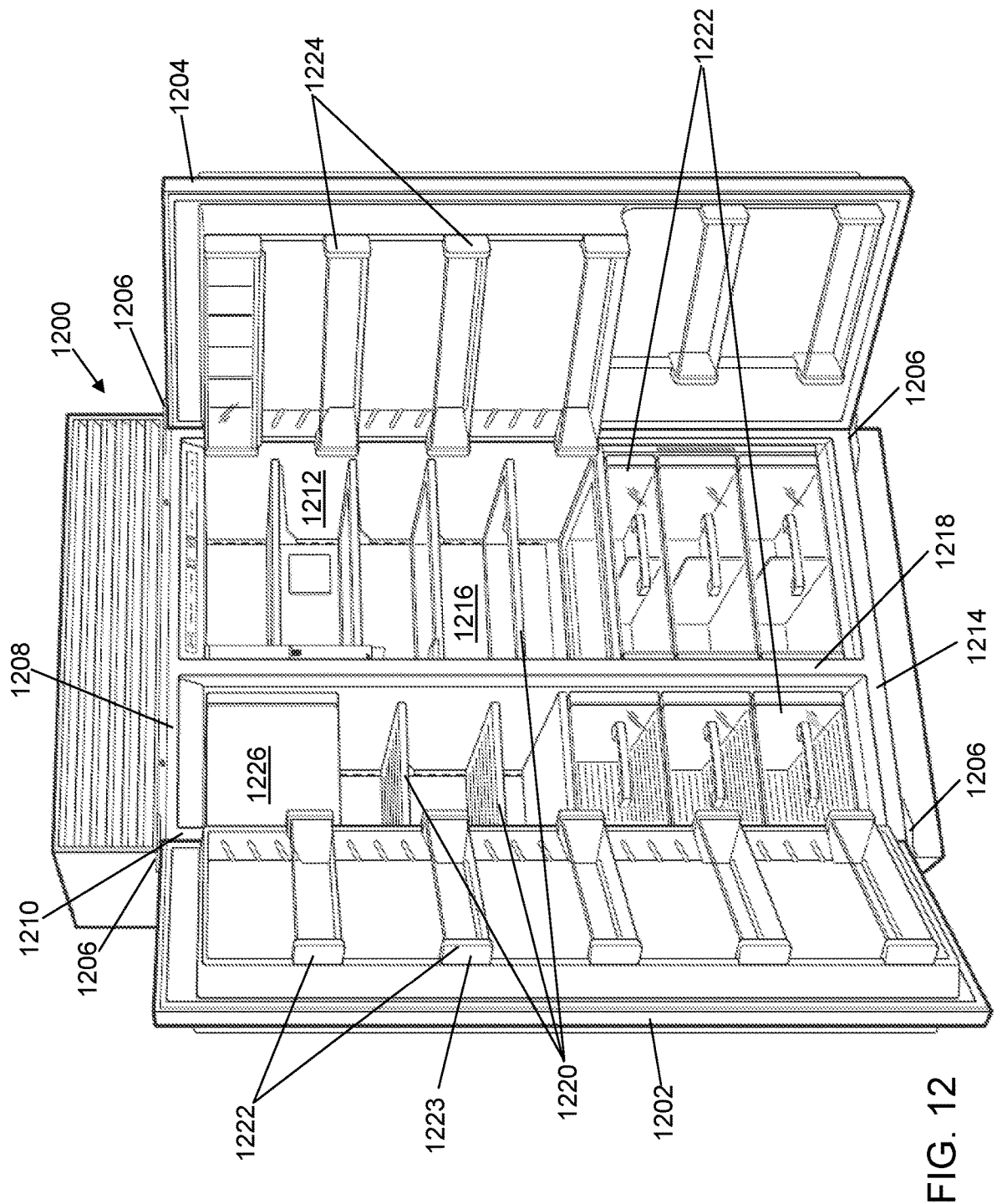
FIG. 12 depicts a left, front, perspective view of a second refrigerator with doors open in accordance with an illustrative embodiment.

With reference to FIG. 12, a second refrigerator 1200 is shown in accordance with an illustrative embodiment. Second refrigerator 1200 may include a freezer compartment door 1202, a refrigerator compartment door 1204, a plurality of hinges 1206, a top wall 1208, a first side wall 1210, a second side wall 1212, a bottom wall 1214, a back wall 1216, and a divider wall 1218. In the illustrative embodiment, freezer compartment door 1202 is rotatably mounted to top wall 1208 and bottom wall 1214 using two hinges of the plurality of hinges 1206, and refrigerator compartment door 1204 is rotatably mounted to top wall 1208 and bottom wall 1214 using another two hinges of the plurality of hinges 1206. In alternative embodiments, freezer compartment door 1202 and/or refrigerator compartment door 1204 may be rotatably mounted to different walls of second refrigerator 1200 using a fewer or a greater number of hinges. Freezer compartment door 1202 provides access to a freezer compartment defined by top wall 1208, first side wall 1210, bottom wall 1214, back wall 1216, divider wall 1218, and freezer compartment door 1202 when freezer compartment door 1202 is in a closed position. Refrigerator compartment door 1204 provides access to a refrigerated compartment defined by top wall 1208, second side wall 1212, bottom wall 1214, back wall 1216, divider wall 1218, and refrigerator compartment door 1204 when refrigerator compartment door 1204 is in a closed position.

Divider wall separates the freezer compartment from the refrigerator compartment. In the illustrative embodiment, divider wall 1218 extends vertically between top wall 1208 and bottom wall 1214. Of course, in alternative embodiments, divider wall 1218 may extend horizontally to separate the two compartments with the freezer compartment either above or below the refrigerated compartment. Additionally, in alternative embodiments, the locations of the freezer compartment and the refrigerated compartment may be reversed. Further, second refrigerator 1200 may include more than two compartments. Additionally, second refrigerator 1200 may not include a refrigerated compartment.

Though shown in the illustrative embodiment as forming a generally rectangular shaped enclosure, second refrigerator 1200 may form any shaped enclosure including other polygons as well as circular or elliptical enclosures. As a result, freezer compartment door 1202, refrigerator compartment door 1204, and the walls forming second refrigerator 1200 may have any shape including other polygons as well as circular or elliptical shapes.

One or more shelves 1220, drawers 1222, or other receptacles 1224 may be mounted within the freezer compartment and the refrigerator compartment. An ice maker/dispenser 126 may be mounted within the freezer space to make and store ice. In an alternative embodiment, ice maker/dispenser 1226 may be mounted to the inside surface of freezer compartment door 1202 as understood by a person of skill in the art. For example, ice maker/dispenser 1226 may be positioned on a door shelf 1223 of the receptacles 1224 to dispense ice when freezer compartment door 1202 is either in the opened or the closed positions. Ice maker/dispenser 1226 further may be mounted directly to a wall of second refrigerator 1200. As understood by a person of skill in the art, the dispensing of ice by the ice dispenser may be controlled using a switch activated by a consumer.

As understood by a person of skill in the art, the walls that form second refrigerator 1200 include insulation to assist in maintenance of the desired temperature in the freezer and refrigerator compartments. Electrical wiring and various conduits may further be located in the walls. The one or more shelves 1220, drawers 1222, or other receptacles 1224 may be formed of one or more materials, such as metals, glass, and/or plastics having a sufficient strength and rigidity to support food items or other items stored in second refrigerator 1200.

Similar to refrigerator 100, a temperature of one or more refrigerated compartments of second refrigerator 1200 is maintained at an adequate temperature to preserve fresh food using a refrigeration system (not shown) as understood by a person of skill in the art, and a temperature of one or more freezer compartments is maintained at an adequate temperature to maintain food stored therein in a frozen state using a second refrigeration system (not shown) as understood by a person of skill in the art. May include two fans and single compressor/evaporator as first refrigerator and freezer may include fan, compressor & evaporator.

Refrigerator controller 1300 controls a flow of refrigerant through each refrigeration system of second refrigerator 1200. Second refrigerator 1200 may include one or more refrigeration systems. The refrigeration system components such as the compressor, the condenser, the evaporator, the dryer, etc. may be mounted to various walls of second refrigerator 1200 either within the walls, on an exterior of the walls relative to second refrigerator 1200, and/or on an interior of the walls relative to second refrigerator 1200.

In the illustrative embodiment, the freezer compartment of second refrigerator 1200 is cooled by the first refrigeration system that includes the first evaporator, first compressor 1344, etc. through the first air circulation system that includes first fan 1342. First temperature sensor 1316, first temperature control 1318, first humidity sensor 1328, and first humidity control 1330 may be mounted to various walls of the freezer compartment of second refrigerator 1200 either within the walls, on an exterior of the walls relative to second refrigerator 1200, and/or on an interior of the walls relative to second refrigerator 1200 to measure the temperature and/or humidity level in the freezer compartment and to allow the user to set a desired temperature and/or a desired humidity level for one or more zones of the freezer compartment as understood by a person of skill in the art.

In the illustrative embodiment, the refrigerated compartment of second refrigerator 1200 may be cooled using the second refrigeration system that includes second evaporator 700, second compressor 1346, etc. with the second air circulation system that includes second fan 704 and with the third air circulation system that includes third fan 800 as described above relative to refrigerator 100 though mounted to/within back wall 1216 of second refrigerator 1200. Instead of cooling the second enclosed space, the second air circulation system that includes second fan 704 may cool the space surrounding drawers 1222 in a lower portion of the refrigerated compartment of second refrigerator 1200. Second temperature sensor 1320, second temperature control 1322, third temperature sensor 1324, third temperature control 1326, second humidity sensor 1332, second humidity control 1334, and third humidity control 1336 may be mounted to various walls of the refrigerated compartment of second refrigerator 1200 either within the walls, on an exterior of the walls relative to second refrigerator 1200, and/or on an interior of the walls relative to second refrigerator 1200 to measure the temperature and/or humidity level in the refrigerated compartment and to allow the user to set a desired temperature and/or a desired humidity level for one or more zones of the refrigerated compartment as understood by a person of skill in the art.

Figure 13:
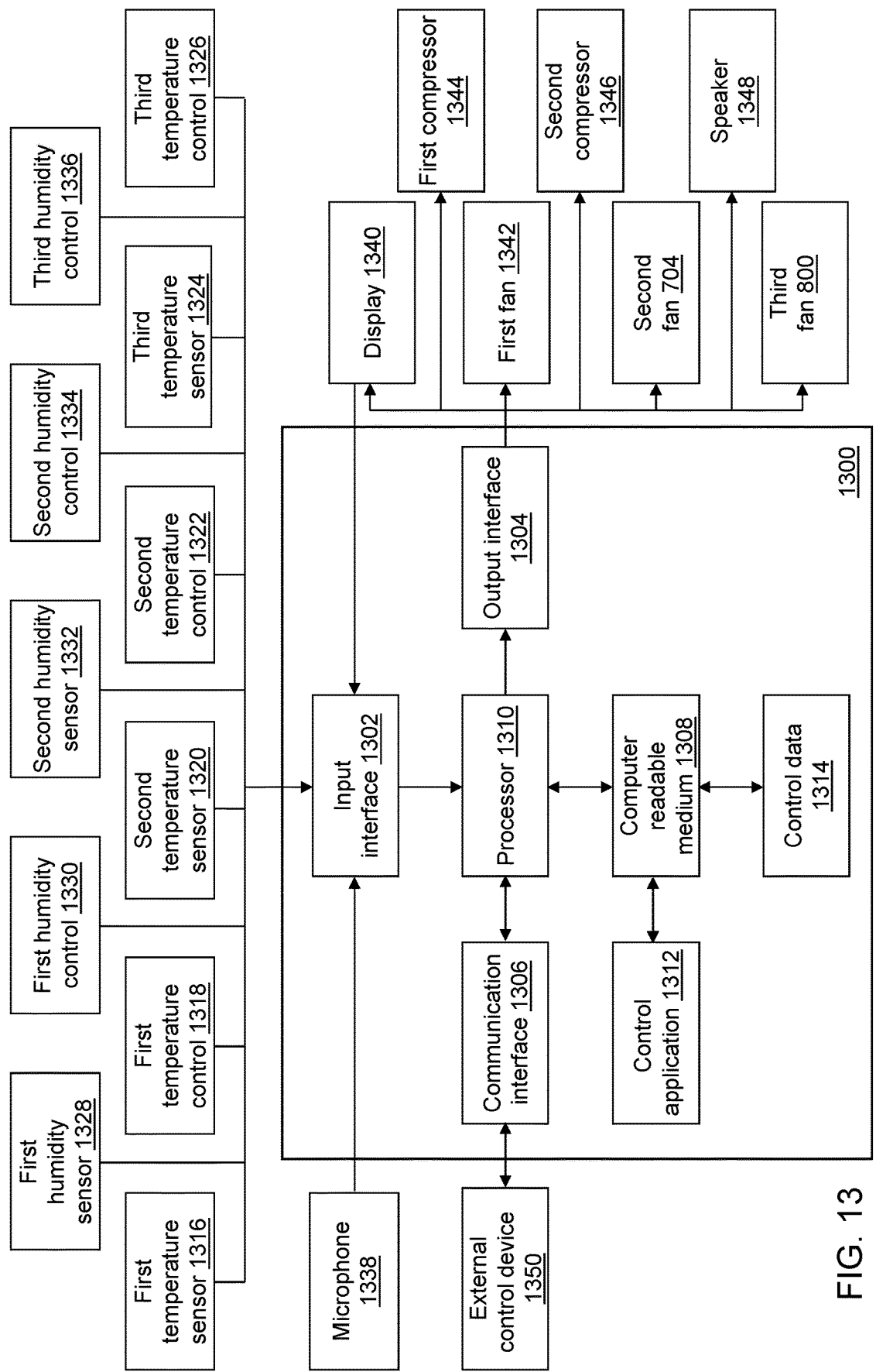
FIG. 13 depicts a block diagram of a refrigerator controller of the refrigerator of FIG. 1 or of FIG. 12 in accordance with an illustrative embodiment.

Referring to FIG. 13, a block diagram of refrigerator controller 1300 is shown in accordance with an illustrative embodiment. Refrigerator controller 1300 may include an input interface 1302, an output interface 1304, a communication interface 1306, a non-transitory computer-readable medium 1308, a processor 1310, a control application 1312, and control data 1314. Fewer, different, and/or additional components may be incorporated into refrigerator controller 1300.

Input interface 1302 provides an interface for receiving information from a user or another device for entry into refrigerator controller 1300 as understood by those skilled in the art. Input interface 1302 may interface with various input technologies including, but not limited to, first temperature sensor 1316, first temperature control 1318, second temperature sensor 1320, second temperature control 1322, third temperature sensor 1324, third temperature control 1326, first humidity sensor 1328, first humidity control 1330, second humidity sensor 1332, second humidity control 1334, third humidity control 1336, etc. For example, each temperature sensor may produce a sensor signal value referred to as a measured temperature value representative of the temperature in an environment to which the temperature sensor is associated. As another example, each humidity sensor may produce a sensor signal value referred to as a measured humidity value representative of the humidity in an environment to which the humidity sensor is associated. Refrigerator 100 and/or second refrigerator 1200 may include various numbers of and types of sensors that measure quantities associated with an operating environment of refrigerator 100 and/or second refrigerator 1200 and their various compartments. Example additional sensor types include a pressure sensor, a fluid flow rate sensor, a voltage sensor, a current sensor, a frequency sensor, an acoustic sensor, a light sensor, a motion sensor, that may be mounted to various components of refrigerator 100 and/or second refrigerator 1200. Where reference is made to refrigerator 100, the reference also includes second refrigerator 1200 though not included for brevity.

Input interface 1302 may further interface with various user input technologies including, but not limited to, a keyboard, a microphone 1338, a mouse, a display 1340, a track ball, a keypad, one or more buttons, one or more switches, one or more knobs, etc. to allow the user to enter information into refrigerator 100 and/or second refrigerator 1200 or to make selections presented in a user interface displayed on display 1340. The same interface may support both input interface 1302 and output interface 1304. For example, display 1340 comprising a touch screen provides a mechanism for user input and for presentation of output to the user. For illustration, first temperature control 1318, second temperature control 1322, third temperature control 1326, first humidity control 1330, second humidity control 1334, and/or third humidity control 1336 may be provided in display 1340 as user interface elements that allow the user to define a temperature or humidity level for a respective area enclosed within refrigerator 100 and/or second refrigerator 1200. The input interface technology further may be accessible by refrigerator controller 1300 through communication interface 1306.

Output interface 1304 provides an interface for outputting information for review by a user of refrigerator controller 1300 and/or for use by another application or device. For example, output interface 1304 may interface with various output technologies including, but not limited to first fan 1342, second fan 704, third fan 800, first compressor 1344, second compressor 1346, display 1340, speaker 1348, etc. Microphone 1338 and speaker 1348 provide voice control and output to the user. Refrigerator controller 1300 may have one or more output interfaces that use the same or a different output interface technology. The output interface technology further may be accessible by refrigerator controller 1300 through communication interface 1306.

Communication interface 1306 provides an interface for receiving and transmitting data between devices using various protocols, transmission technologies, and media as understood by those skilled in the art. Communication interface 1306 may support communication using various transmission media that may be wired and/or wireless. Refrigerator controller 1300 may have one or more communication interfaces that use the same or a different communication interface technology. For example, refrigerator controller 1300 may support communication using an Ethernet port, a Bluetooth antenna, a telephone jack, a USB port, etc. Data and messages may be transferred between refrigerator controller 1300 and an external control device 1350 using communication interface 1306. For illustration, external control device 1350 may be a smart phone that may send a temperature set value and/or a humidity set value to refrigerator controller 1300 through communication interface 1306 instead of using first temperature control 1318, second temperature control 1322, third temperature control 1326, first humidity control 1330, second humidity control 1334, third humidity control 1336, etc. The temperature set value and/or humidity set value may be specific values and/or may be indicators to increase or decrease a current set value and/or may indicate general levels such as high, medium, low, freezer, fresh food, crisper, etc.

Non-transitory computer-readable medium 1308 is an electronic holding place or storage for information so the information can be accessed by processor 1310 as understood by those skilled in the art. Computer-readable medium 1308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Refrigerator controller 1300 may have one or more computer-readable media that use the same or a different memory media technology. For example, computer-readable medium 1308 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Refrigerator controller 1300 also may have one or more drives that support the loading of a memory media such as a CD, DVD, an external hard drive, etc. One or more external hard drives further may be connected to refrigerator controller 1300 using communication interface 1306.

Processor 1310 executes instructions as understood by those skilled in the art. The instructions may be carried out by a special purpose computer, logic circuits, or hardware circuits. Processor 1310 may be implemented in hardware and/or firmware. Processor 1310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 1310 operably couples with input interface 1302, with output interface 1304, with communication interface 1306, and with computer-readable medium 1308 to receive, to send, and to process information. Processor 1310 may retrieve a set of instructions from a permanent memory device and copy the instructions in an executable form to a temporary memory device that is generally some form of RAM. Refrigerator controller 1300 may include a plurality of processors that use the same or a different processing technology.

Control application 1312 performs operations associated with controlling the operation of refrigerator 100 and/or second refrigerator 1200 to cool the various compartments to the selected temperature and/or humidity level using data stored in control data 1314, first temperature control 1318, second temperature control 1322, third temperature control 1326, first humidity control 1330, second humidity control 1334, third humidity control 1336, sensor measurements, first fan 1342, second fan 704, third fan 800, first compressor 1344, second compressor 1346, etc. The operations may be implemented using hardware, firmware, software, or any combination of these methods. Referring to the example embodiment of FIG. 13, control application 1312 is implemented in software (comprised of computer-readable and/or computer-executable instructions) stored in computer-readable medium 1308 and accessible by processor 1310 for execution of the instructions that embody the operations of control application 1312. Control application 1312 may be written using one or more programming languages, assembly languages, scripting languages, etc.

Referring to FIGS. 14A to 14C, 15A to 15C, and 16A to 16C, example operations associated with control application 1312 are described for refrigerator 100 and/or second refrigerator 1200 that include. Additional, fewer, or different operations may be performed depending on the embodiment of control application 1312. The order of presentation of the operations of FIG. 32 is not intended to be limiting. Although some of the operational flows are presented in sequence, the various operations may be performed in various repetitions, concurrently (in parallel, for example, using threads), and/or in other orders than those that are illustrated. Control application 1312 may perform other operations, for example, associated with making ice, dispensing ice, turning on or off one or more lights, turning on or off a dryer based on a humidity level, detecting a door open or close, etc.

In the illustrative embodiment, refrigerator 100 and/or second refrigerator 1200 include three cooling zones where the second and third zones (e.g., second compartment 104 and third compartment 106) are described as shared zones because they share second compressor 1346 and second evaporator 700. Second compressor 1346 and second evaporator 700 are shared between second compartment 104 and third compartment 106 eliminating an evaporator and/or compressor to cool second compartment 104 in addition to third compartment 106 though allowing independent control of cooling to second compartment 104. Again, as shown in second refrigerator 1200, second compartment 104 need not be a separate compartment but may be an area within third compartment 106. In alternative embodiments, control application 1312 may control a greater or a fewer number of refrigeration systems arranged to cool any number of compartments.

In an operation 1400, a first temperature set value may be received that indicates a desired temperature set for first compartment 102. For example, the first temperature set value may be received from first temperature control 1318 through input interface 1302 or communication interface 1306. The first temperature set value may be stored in computer-readable medium 1308 such as in control data 1314. For example, when refrigerator 100 is powered on, an initial first temperature set value may be read from control data 1314. The first temperature set value may remain at the initial first temperature set value until changed by a user using first temperature control 1318.

Similarly, in an operation 1402, a second temperature set value may be received that indicates a desired temperature set for second compartment 104. For example, the second temperature set value may be received from second temperature control 1322 through input interface 1302 or communication interface 1306.

Similarly, in an operation 1404, a third temperature set value may be received that indicates a desired temperature set for third compartment 106. For example, the third temperature set value may be received from third temperature control 1326 through input interface 1302 or communication interface 1306. The third temperature set value may be stored in control data 1314.

In an operation 1406, a first humidity set value may be received that indicates a desired humidity set for first compartment 102. For example, the first humidity set value may be received from first humidity control 1330 through input interface 1302 or communication interface 1306. The first humidity set value may be stored in computer-readable medium 1308 such as in control data 1314. For example, when refrigerator 100 is powered on, an initial first humidity set value may be read from control data 1314. The first humidity set value may remain at the initial first humidity set value until changed by a user using first humidity control 1318. In an alternative embodiment, a first humidity increase indicator or a first humidity decrease indicator may be received that indicates a desired humidity change for first compartment 102 instead of a first humidity set value.

Similarly, in an operation 1408, a second humidity set value may be received that indicates a desired humidity set for second compartment 104. For example, the second humidity set value may be received from second humidity control 1334 through input interface 1302 or communication interface 1306. In an alternative embodiment, a second humidity increase indicator or a second humidity decrease indicator may be received that indicates a desired humidity change for second compartment 104 instead of a second humidity set value.

Similarly, in an operation 1409, a third humidity set value may be received that indicates a desired humidity set for third compartment 106. For example, the third humidity set value may be received from third humidity control 1336 through input interface 1302 or communication interface 1306. The third humidity set value may be stored in control data 1314. In an alternative embodiment, a third humidity increase indicator or a third humidity decrease indicator may be received that indicates a desired humidity change for third compartment 106 instead of a third humidity set value.

In an operation 1410, a first temperature value may be received that indicates a current temperature in first compartment 102. For example, the first temperature value may be received from first temperature sensor 1316 through input interface 1302 or communication interface 1306.

In an operation 1412, a first humidity value may be received that indicates a current humidity in first compartment 102. For example, the first humidity value may be received from first humidity sensor 1328 through input interface 1302 or communication interface 1306.

In an operation 1414, the first temperature value is compared to the first temperature set value.

In an operation 1416, a determination is made concerning whether or not cooling is needed in first compartment 102 based on the comparison in operation 1414. For example, cooling may be needed when the first temperature value is greater than or equal to the first temperature set value by a predefined number of degrees that may be zero. The predefined number of degrees may be in Fahrenheit or Celsius and may be stored in control data 1314. When cooling is needed in first compartment 102, processing continues in an operation 1418. When cooling is not needed in first compartment 102, processing continues in an operation 1500 shown referring to FIG. 15A.

In operation 1418, a first fan speed is determined when first fan 1342 is a variable speed fan. For example, the first fan speed may be selected based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate a first fan speed for first fan 1342 under various operating conditions.

In an operation 1420, a first compressor speed is determined when first compressor 1344 is a variable speed compressor. For example, the first compressor speed may be selected based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate a first compressor speed for first compressor 1344 under various operating conditions.

In an operation 1422, a first compressor run time is determined for first compressor 1344. For example, the first compressor run time may be selected based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate a first compressor run time for first compressor 1344 under various operating conditions. In an illustrative embodiment, the first compressor run time is used to determine the compressor speed setting. A target optimal run time may be set for first compressor 1344 to be on each cooling cycle where the compressor speed is adjusted to achieve the target optimum run time.

In an operation 1424, a determination is made concerning whether or not an increase in humidity level is needed in first compartment 102. For example, when the user selects first humidity control 1330 it may indicate that the humidity level be increased, which results in a determination that an increase in humidity level is needed in first compartment 102. Alternatively, when refrigerator 100 includes first humidity sensor 1328, a first humidity value measured by first humidity sensor 1328 is compared to the first humidity set value to determine that an increase in humidity level is needed in first compartment 102. For example, an increase in humidity may be needed when the first humidity value is less than or equal to the first humidity set value by a predefined humidity value that may be zero. The humidity level may be defined as a percentage value that may be stored in control data 1314. As a result, the determination may or may not use the first humidity value measured by first humidity sensor 1328. When an increase in humidity level is needed in first compartment 102, processing continues in an operation 1426. When an increase in humidity level is not needed in first compartment 102, processing continues in an operation 1456 shown referring to FIG. 14C.

In operation 1426, the first compressor run time determined in operation 1422 is increased by a predefined amount. For example, the first compressor run time may be increased based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate an increase in first compressor run time for first compressor 1344 under various operating conditions.

In an operation 1428, the first compressor speed determined in operation 1420 is decreased by a predefined amount. For example, the first compressor speed may be decreased based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate a decrease in first compressor speed for first compressor 1344 under various operating conditions. The reduction in the first compressor speed allows the first evaporator to run at a warmer temperature and therefore be wetter which increases humidity in first compartment 102.

Figure 14A:
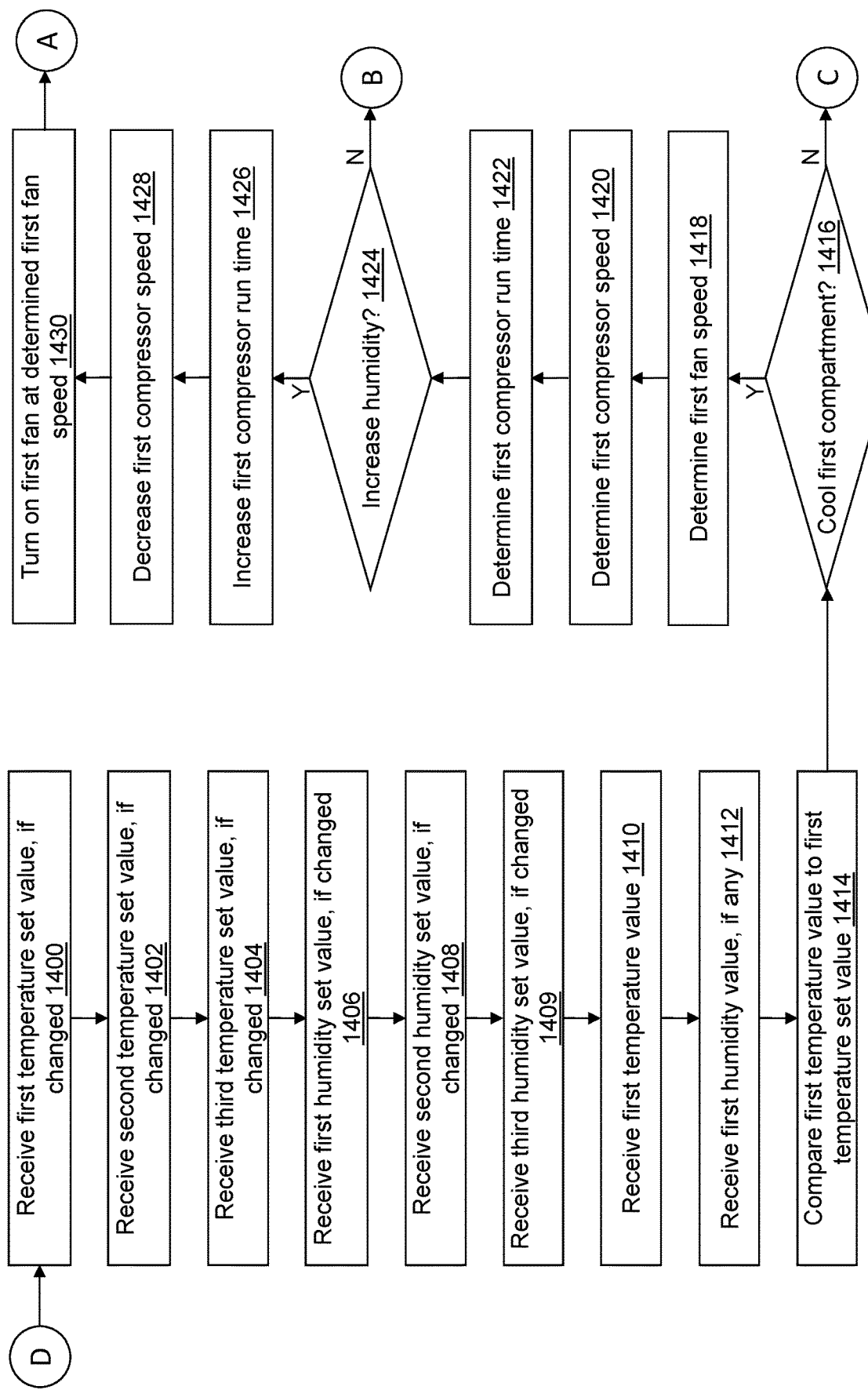
Figure 14B:
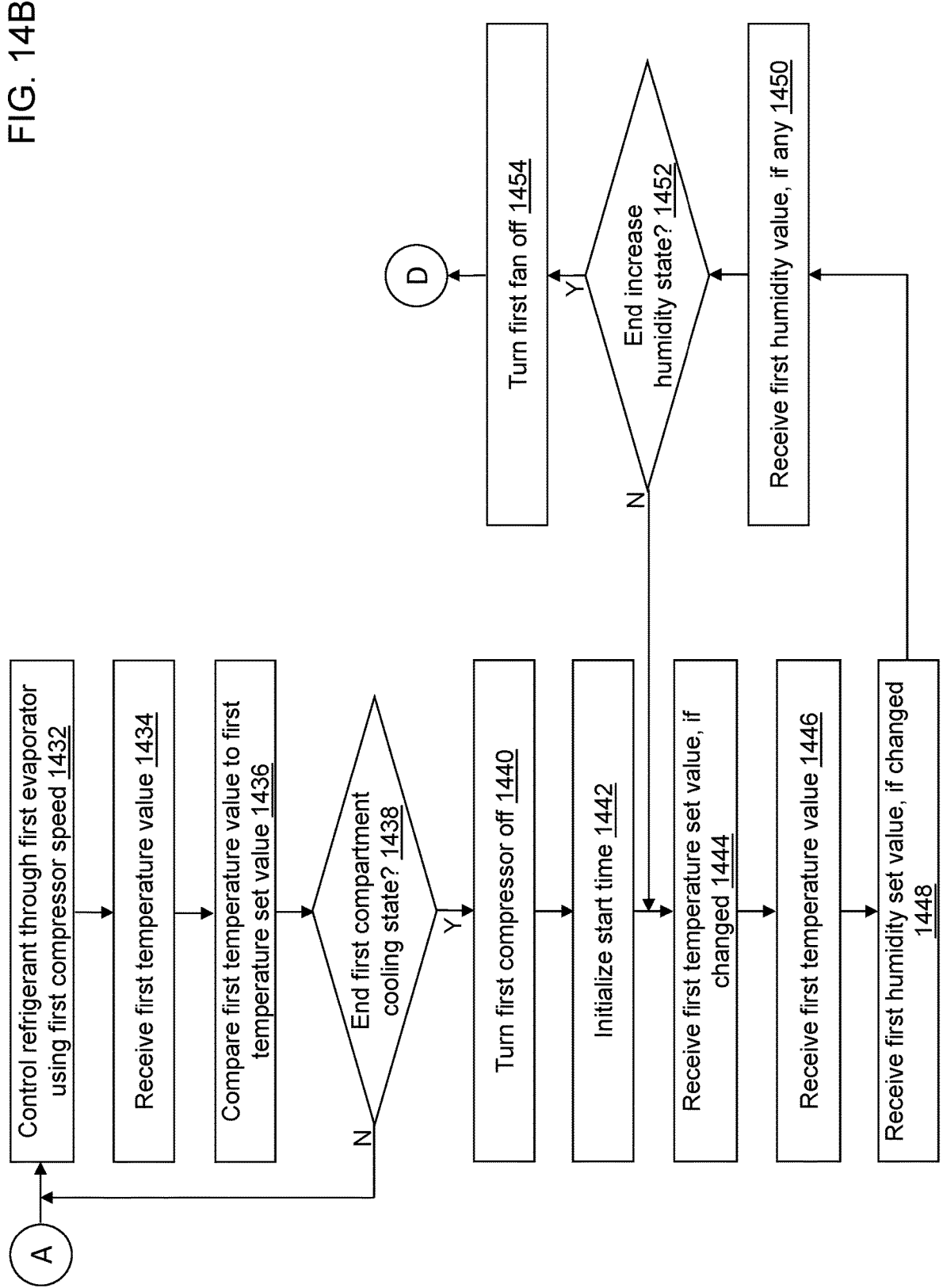

In an operation 1430, first fan 1342 is signaled to turn on, and processing continues in an operation 1432 shown referring to FIG. 14B. When first fan 1342 is a variable speed fan, first fan 1342 is signaled to turn on at the first fan speed determined in operation 1418.

Referring to FIG. 14B, in operation 1432, a flow of first refrigerant through the first evaporator is controlled to cool the air circulated through and by the first air circulation system based on a flow of refrigerant through the first evaporator and first compressor 1344 among other refrigeration components. First compressor 1344 is signaled to turn on at the decreased first compressor speed determined in operation 1428.

In an operation 1434, a first temperature value may be received that indicates a current temperature in first compartment 102. For example, the first temperature value may be received from first temperature sensor 1316 through input interface 1302 or communication interface 1306.

In an operation 1436, the first temperature value is compared to the first temperature set value.

In an operation 1438, a determination is made concerning whether or not cooling of first compartment 102 is ended based on the comparison in operation 1436. For example, cooling may be ended when the first temperature value is less than or equal to the first temperature set value by a predefined number of degrees that may be zero. The predefined number of degrees may be in Fahrenheit or Celsius and may be stored in control data 1314. When cooling of first compartment 102 is not ended, processing continues in operation 1432. When cooling of first compartment 102 is ended, processing continues in an operation 1440.

In operation 1440, first compressor 1344 is signaled to turn off.

In an operation 1442, a start time is initialized for a humidity increase state.

In an operation 1444, a first temperature set value may be received that indicates a change in the desired temperature set for first compartment 102. For example, the first temperature set value may be received from first temperature control 1318 through input interface 1302 or communication interface 1306 after receipt in operation 1400.

In an operation 1446, a first temperature value may be received that indicates a current temperature in first compartment 102. For example, the first temperature value may be received from first temperature sensor 1316 through input interface 1302 or communication interface 1306.

In an operation 1448, the first humidity set value may be received that indicates a change in the desired humidity set for first compartment 102. For example, the first humidity set value may be received from first humidity control 1330 through input interface 1302 or communication interface 1306 after receipt in operation 1406.

In an operation 1450, a first humidity value may be received that indicates a current humidity in first compartment 102. For example, the first humidity value may be received from first humidity sensor 1328 through input interface 1302 or communication interface 1306.

In an operation 1452, a determination is made concerning whether or not the humidity increase state is ended. When the humidity increase state is not ended, processing continues in operation 1444. When the humidity increase state is ended, processing continues in an operation 1454.

For example, the humidity increase state may be ended when the first temperature value is greater than the first temperature set value by a predefined number of degrees that may be zero. As another example, the humidity increase state may be ended when the first temperature value is less than the first temperature set value by a predefined number of degrees that may be zero. In an illustrative embodiment, the predefined number of degrees is a preset value based on food preservation design lab testing that evaluates a balance between weight loss in a food product and a risk of visible condensation in a food storage area such as first compartment 102 given a design of the refrigerator/freezer and the compartment/zone arrangement. An illustrative range for the predefined number of degrees could be between 0 degrees Fahrenheit (° F.) and 15° F.

As still another example, the humidity increase state may be ended when a difference between a current time and the start time initialized in operation 1142 exceeds a predefined period of time that may be stored in control data 1314. In an illustrative embodiment, the predefined period of time is a preset value based on food preservation design lab testing that evaluates a balance between weight loss in a food product and a risk of visible condensation in a food storage area such as first compartment 102 given a design of the refrigerator/freezer and the compartment/zone arrangement. An illustrative range for the predefined period of time could be between 0 minutes to 30 minutes.

For illustration, testing is performed with lettuce, or another high moisture content product, stored in a refrigerator drawer, and a weight loss of the lettuce over the course of the testing is monitored under various operating conditions such as various values for the predefined number of degrees and/or for the predefined period of time in various refrigerators with different compartment/zone arrangements. Less weight loss means a higher food preservation as the lettuce is retaining its moisture and not drying out. At the same time, signs of visible condensation are monitored on the internal surfaces of the drawers and on the bottom of drawer covers as well as for pooling water in the bottoms of the drawers. A rating system is used to evaluate and rank any visual condensation against an approved rating scale. Design and testing is performed to optimize the moisture retention in the food while also resulting in an acceptable visible moisture rating scale.

As yet another example, the humidity increase state may be ended when the first humidity value is greater than the first humidity set value by a predefined value that may be zero and may be stored in control data 1314. As still another example, the humidity increase state may be ended when the first humidity set value is changed by a user. For example, the user may decrease the first humidity set value or may change the first humidity set value to indicate a lower humidity level. Occurrence of one or more of these events may trigger the humidity increase state to end.

In operation 1454, first fan 1342 is signaled to turn off, and processing continues in operation 1400 to continue to monitor the state of each compartment.

Figure 14C:
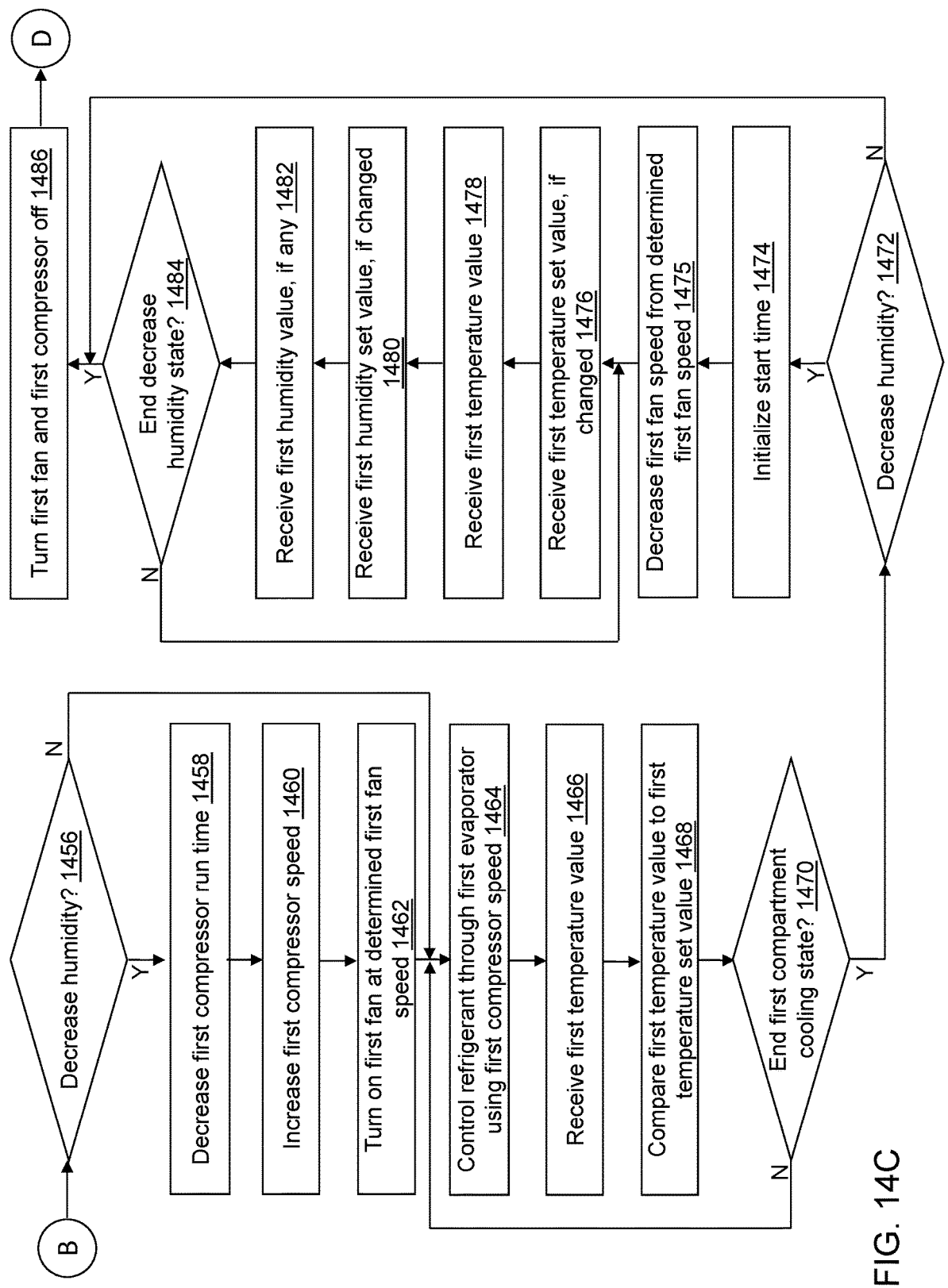

Referring to FIG. 14C, in operation 1456, a determination is made concerning whether or not a decrease in humidity level is needed in first compartment 102. For example, when the user selects first humidity control 1330 it may indicate that the humidity level be decreased, which results in a determination that a decrease in humidity level is needed in first compartment 102. Alternatively, when refrigerator 100 includes first humidity sensor 1328, a first humidity value measured by first humidity sensor 1328 is compared to the first humidity set value to determine that a decrease in humidity level is needed in first compartment 102. For example, a decrease in humidity may be needed when the first humidity value is greater than the first humidity set value by a predefined humidity value that may be zero. The predefined humidity level may be defined as a percentage value and may be stored in control data 1314. As a result, the determination may or may not use the first humidity value measured by first humidity sensor 1328. When a decrease in humidity level is needed in first compartment 102, processing continues in an operation 1458. When a decrease in humidity level is not needed in first compartment 102, processing continues in an operation 1464.

In operation 1458, the first compressor run time determined in operation 1422 is decreased by a predefined amount. For example, the first compressor run time may be decreased based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate a decrease in first compressor run time for first compressor 1344 under various operating conditions.

In an operation 1460, the first compressor speed determined in operation 1420 is increased by a predefined amount. For example, the first compressor speed may be increased based on an operational mode of refrigerator 100, a predefined food storage type for first compartment 102 such as frozen, fresh food, crisper, etc., the temperature difference between the first temperature value and the first temperature set value, etc. For example, tables may be stored in control data 1314 to indicate an increase in first compressor speed for first compressor 1344 under various operating conditions. The increase in the first compressor speed allows the first evaporator to run at a colder temperature and therefore be dryer which reduces humidity in first compartment 102.

In an operation 1462, first fan 1342 is signaled to turn on. When first fan 1342 is a variable speed fan, first fan 1342 is signaled to turn on at the first fan speed determined in operation 1418.

In operation 1464, a flow of first refrigerant through the first evaporator is controlled to cool the air circulated through and by the first air circulation system based on a flow of refrigerant through the first evaporator and first compressor 1344 among other refrigeration components. First compressor 1344 is signaled to turn on at the increased first compressor speed determined in operation 1460.

In an operation 1466, a first temperature value may be received that indicates a current temperature in first compartment 102. For example, the first temperature value may be received from first temperature sensor 1316 through input interface 1302 or communication interface 1306.

In an operation 1468, the first temperature value is compared to the first temperature set value.

Similar to operation 1438, in an operation 1470, a determination is made concerning whether or not cooling of first compartment 102 is ended based on the comparison in operation 1468. When cooling of first compartment 102 is not ended, processing continues in operation 1464. When cooling of first compartment 102 is ended, processing continues in an operation 1472.

In operation 1472, a determination is made concerning whether or not a decrease in humidity level was indicated in operation 1456. When a decrease in humidity level was indicated in operation 1456, processing continues in an operation 1474. When a decrease in humidity level was not indicated in operation 1456, processing continues in an operation 1486.

In an operation 1474, a start time is initialized for a humidity decrease state.

In an operation 1475, when first fan 1342 is a variable speed fan, first fan 1342 is signaled to decrease its fan speed by a predefined amount from the first fan speed determined in operation 1418.

In an operation 1476, a first temperature set value may be received that indicates a change in the desired temperature set for first compartment 102. For example, the first temperature set value may be received from first temperature control 1318 through input interface 1302 or communication interface 1306 after receipt in operation 1400.

In an operation 1478, a first temperature value may be received that indicates a current temperature in first compartment 102. For example, the first temperature value may be received from first temperature sensor 1316 through input interface 1302 or communication interface 1306.

In an operation 1480, the first humidity set value may be received that indicates a change in the desired humidity set for first compartment 102. For example, the first humidity set value may be received from first humidity control 1330 through input interface 1302 or communication interface 1306 after receipt in operation 1406.

In an operation 1482, a first humidity value may be received that indicates a current humidity in first compartment 102. For example, the first humidity value may be received from first humidity sensor 1328 through input interface 1302 or communication interface 1306.

In an operation 1484, a determination is made concerning whether or not the humidity decrease state is ended. When the humidity decrease state is not ended, processing continues in operation 1476. When the humidity decrease state is ended, processing continues in operation 1486. For example, the humidity decrease state may be ended when the first temperature value is less than the first temperature set value by a predefined number of degrees that may be zero. As another example, the humidity decrease state may be ended when the first temperature value is greater than the first temperature set value by a predefined number of degrees that may be zero where the predefined number of degrees is a preset value based on food preservation design lab testing that evaluates a balance between weight loss in a food product and a risk of visible condensation in a food storage area such as first compartment 102 given a design of the refrigerator/freezer and the compartment/zone arrangement. As still another example, the humidity decrease state may be ended when a difference between a current time and the start time initialized in operation 1474 exceeds a predefined period of time that may be stored in control data 1314 the predefined period of time is a preset value based on food preservation design lab testing that evaluates a balance between weight loss in a food product and a risk of visible condensation in a food storage area such as first compartment 102 given a design of the refrigerator/freezer and the compartment/zone arrangement. As yet another example, the humidity decrease state may be ended when the first humidity value is less than the first humidity set value by a predefined value that may be zero and may be stored in control data 1314. As still another example, the humidity decrease state may be ended when the first humidity set value is changed by a user. For example, the user may increase the first humidity set value or may change the first humidity set value to indicate a higher humidity level. Occurrence of one or more of these events may trigger the humidity decrease state to end.

In operation 1486, first fan 1342 and first compressor 1344 are signaled to turn off, and processing continues in operation 1400 to continue to monitor the state of each compartment.

Referring to FIG. 15A, in operation 1500, a second temperature value may be received that indicates a current temperature in second compartment 104. For example, the second temperature value may be received from second temperature sensor 1320 through input interface 1302 or communication interface 1306.

In an operation 1502, a second humidity value may be received that indicates a current humidity in second compartment 104. For example, the second humidity value may be received from second humidity sensor 1332 through input interface 1302 or communication interface 1306.

In an operation 1504, the second temperature value is compared to the second temperature set value to determine if cooling is needed in second compartment 104.

In an operation 1506, a determination is made concerning whether or not cooling is needed in second compartment 104 based on the comparison in operation 1504. For example, cooling may be needed when the second temperature value is greater than or equal to the second temperature set value by a predefined number of degrees that may be zero. The predefined number of degrees may be in Fahrenheit or Celsius and may be stored in control data 1314. When cooling is needed in second compartment 104, processing continues in an operation 1508. When cooling is not needed in second compartment 104, processing continues in an operation 1600 shown referring to FIG. 16A.

In operation 1508, a second fan speed is determined when second fan 704 is a variable speed fan. For example, the second fan speed may be selected based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate a second fan speed for second fan 704 under various operating conditions.

In an operation 1510, a second compressor speed is determined when second compressor 1346 is a variable speed compressor. For example, the second compressor speed may be selected based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate a second compressor speed for second compressor 1346 under various operating conditions.

In an operation 1512, a second compressor run time is determined for second compressor 1346. For example, the second compressor run time may be selected based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate a second compressor run time for second compressor 1346 under various operating conditions.

In an operation 1514, a determination is made concerning whether or not an increase in humidity level is needed in second compartment 104. For example, when the user selects second humidity control 1334 it may indicate that the humidity level be increased, which results in a determination that an increase in humidity level is needed in second compartment 104. Alternatively, when refrigerator 100 includes second humidity sensor 1332, a second humidity value measured by second humidity sensor 1332 is compared to the second humidity set value to determine that an increase in humidity level is needed in second compartment 104. For example, an increase in humidity may be needed when the second humidity value is less than or equal to the second humidity set value by a predefined humidity value that may be zero. The humidity level may be defined as a percentage value that may be stored in control data 1314. As a result, the determination may or may not use the second humidity value measured by second humidity sensor 1332. When an increase in humidity level is needed in second compartment 104, processing continues in an operation 1516. When an increase in humidity level is not needed in second compartment 104, processing continues in an operation 1558 shown referring to FIG. 15C.

In operation 1516, the second compressor run time determined in operation 1512 is increased by a predefined amount. For example, the second compressor run time may be increased based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate an increase in second compressor run time for second compressor 1346 under various operating conditions.

In an operation 1518, the second compressor speed determined in operation 1510 is decreased by a predefined amount. For example, the second compressor speed may be decreased based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate a decrease in second compressor speed for second compressor 1346 under various operating conditions.

In an operation 1520, second fan 704 is signaled to turn on. When second fan 704 is a variable speed fan, second fan 704 is signaled to turn on at the second fan speed determined in operation 1508.

In an operation 1522, a flow of second refrigerant through second evaporator 700 is controlled to cool the air circulated through and by the second air circulation system based on a flow of refrigerant through second evaporator 700 and second compressor 1346 among other refrigeration components. Second compressor 1346 is signaled to turn on at the decreased second compressor speed determined in operation 1510.

In an operation 1524, a second temperature value may be received that indicates a current temperature in second compartment 104. For example, the second temperature value may be received from second temperature sensor 1320 through input interface 1302 or communication interface 1306.

In an operation 1526, the second temperature value is compared to the second temperature set value.

In an operation 1528, a determination is made concerning whether or not cooling of second compartment 104 is ended based on the comparison in operation 1526. For example, cooling may be ended when the second temperature value is less than or equal to the second temperature set value by a predefined number of degrees that may be zero. The predefined number of degrees may be in Fahrenheit or Celsius and may be stored in control data 1314. When cooling of second compartment 104 is not ended, processing continues in operation 1522. When cooling of second compartment 104 is ended, processing continues in an operation 1530.

In an operation 1530, a determination is made concerning whether or not second compartment 104 is a zone that shares a refrigeration system with another compartment that is also cooling and therefore using second compressor 1346 and/or second evaporator 700. When second compartment 104 is a zone that shares a refrigeration system with another compartment that is also cooling, processing continues in operation 1532. When second compartment 104 is not a zone that shares a refrigeration system or the compartment that shares the refrigeration system is not cooling, processing continues in an operation 1534 shown referring to FIG. 15B.

In operation 1532, second fan 704 is signaled to turn off, and processing continues in operation 1530 until the shared zone(s) are no longer cooling. If second fan 704 continued to run while a shared zone was cooling, the humidity in the zone may decrease rather than increase.

Figure 15B:
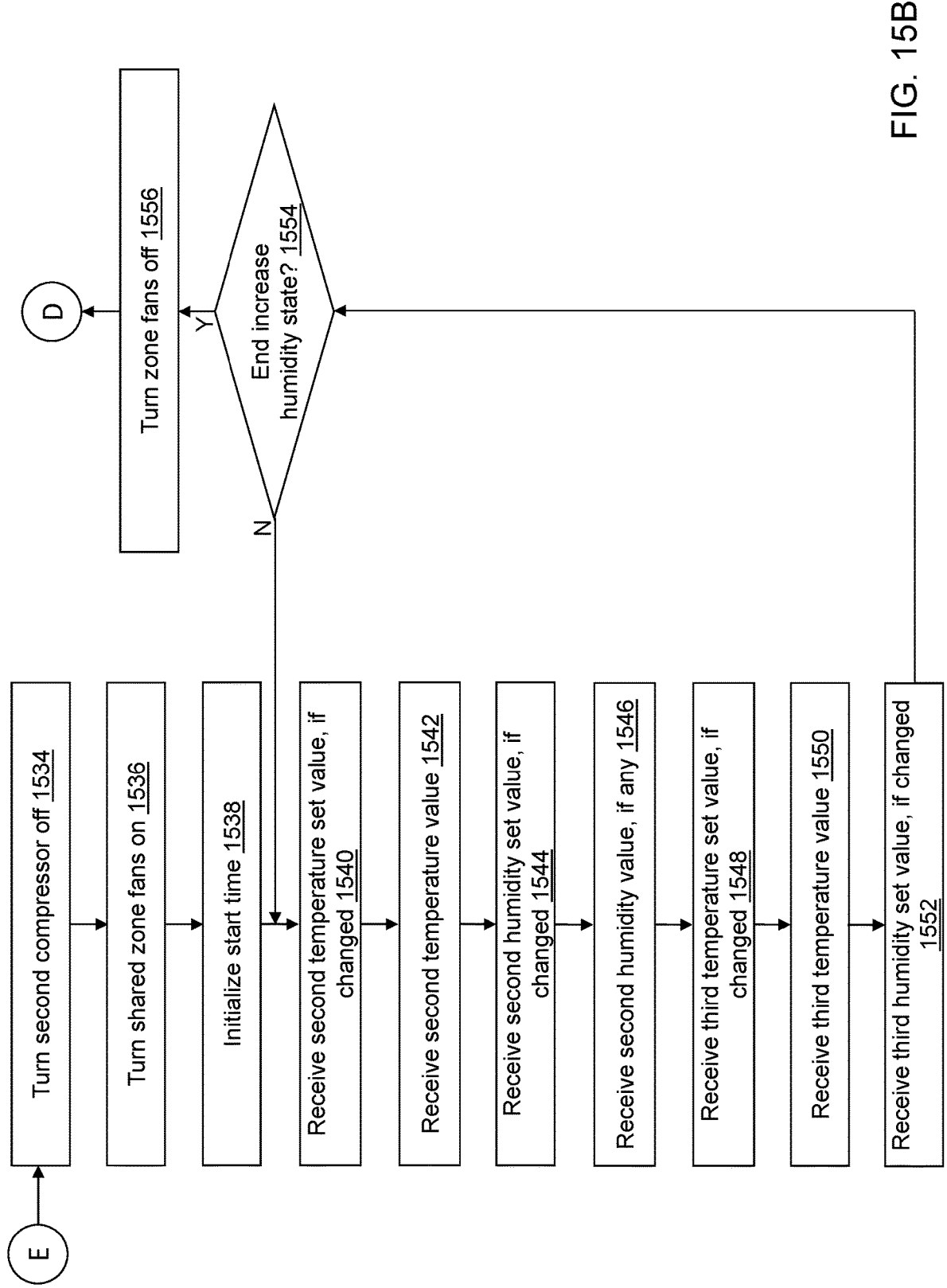

Referring to FIG. 15B, in operation 1534, second compressor 1346 is signaled to turn off once all of the shared zones are no longer cooling.

In an operation 1536, the fans of all of the shared zones, if any, are signaled to turn on. For example, in the illustrative embodiment, second compartment 104 and third compartment 106 are shared zones. As a result, third fan 800 is signaled to turn on at the third fan speed determined in an operation 1612 (shown referring to FIG. 16A), and second fan 704 is signaled to turn on at the second fan speed determined in operation 1512. As another option only certain evaporator fans are turned on to target humidity increases in specific areas of refrigerator 100 or second refrigerator 1200.

In an operation 1538, a start time is initialized for a humidity increase state for second compartment 104.

In an operation 1540, a second temperature set value may be received that indicates a change in the desired temperature set for second compartment 104. For example, the second temperature set value may be received from second temperature control 1322 through input interface 1302 or communication interface 1306 after receipt in operation 1402.

In an operation 1542, a second temperature value may be received that indicates a current temperature in second compartment 104. For example, the second temperature value may be received from second temperature sensor 1320 through input interface 1302 or communication interface 1306.

In an operation 1544, the second humidity set value may be received that indicates a change in the desired humidity set for second compartment 104. For example, the second humidity set value may be received from second humidity control 1334 through input interface 1302 or communication interface 1306 after receipt in operation 1408.

In an operation 1546, a second humidity value may be received that indicates a current humidity in second compartment 104. For example, the second humidity value may be received from second humidity sensor 1332 through input interface 1302 or communication interface 1306.

When second compartment 104 and third compartment 106 are shared zones, in an operation 1548, a third temperature set value may be received that indicates a change in the desired temperature set for third compartment 106. For example, the third temperature set value may be received from third temperature control 1326 through input interface 1302 or communication interface 1306 after receipt in operation 1404.

When second compartment 104 and third compartment 106 are shared zones, in an operation 1550, a third temperature value may be received that indicates a current temperature in third compartment 106. For example, the third temperature value may be received from third temperature sensor 1324 through input interface 1302 or communication interface 1306.

When second compartment 104 and third compartment 106 are shared zones, in an operation 1552, the third humidity set value may be received that indicates a change in the desired humidity set for third compartment 106. For example, the third humidity set value may be received from third humidity control 1336 through input interface 1302 or communication interface 1306 after receipt in operation 1409. A third humidity value is not received in the illustrative embodiment because refrigerator 100 does not include a third humidity sensor.

In an operation 1554, a determination is made concerning whether or not the humidity increase state is ended. When the humidity increase state is not ended, processing continues in operation 1540. When the humidity increase state is ended, processing continues in an operation 1556.

For example, the humidity increase state may be ended when the second temperature value is greater than the second temperature set value by a predefined number of degrees that may be zero. As another example, the humidity increase state may be ended when the second temperature value is less than the second temperature set value by a predefined number of degrees that may be zero. As still another example, the humidity increase state may be ended when a difference between a current time and the start time initialized in operation 1538 exceeds a predefined period of time that may be stored in control data 1314. As yet another example, the humidity increase state may be ended when the second humidity value is greater than the second humidity set value by a predefined value that may be zero and may be stored in control data 1314. As still another example, the humidity increase state may be ended when the second humidity set value is changed by a user. For example, the user may decrease the second humidity set value or may change the second humidity set value to indicate a lower humidity level. As still another example, the humidity increase state may be ended when a shared zone requires cooling. For example, third compartment 106 may require cooling. Occurrence of one or more of these events may trigger the humidity increase state to end.

In operation 1556, all of the shared zone fans such as second fan 704 and third fan 800 are signaled to turn off, and processing continues in operation 1400 to continue to monitor the state of each compartment.

Figure 15C:
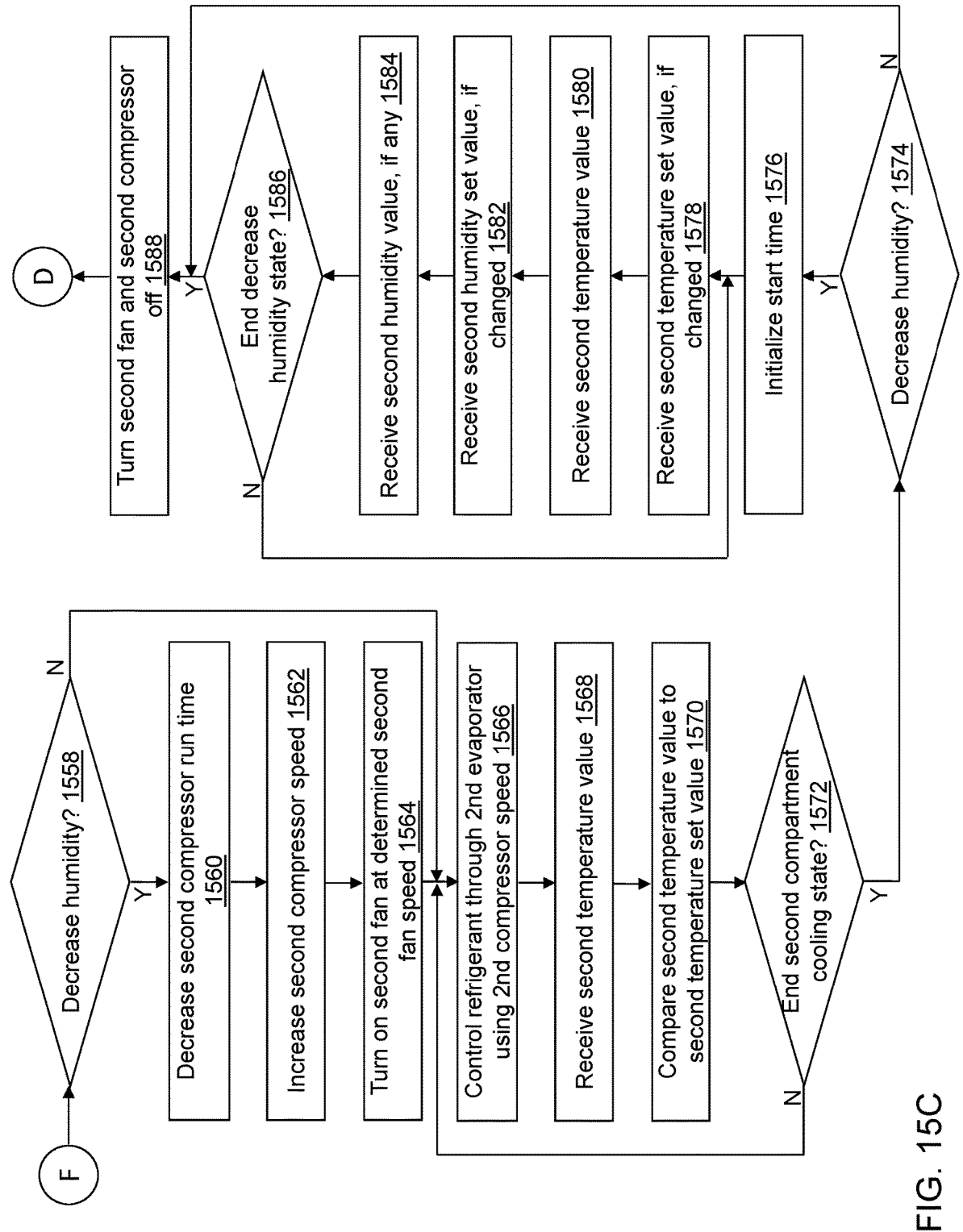

Referring to FIG. 15C, in operation 1558, a determination is made concerning whether or not a decrease in humidity level is needed in second compartment 104. For example, when the user selects second humidity control 1334 it may indicate that the humidity level be decreased, which results in a determination that a decrease in humidity level is needed in second compartment 104.

Alternatively, when refrigerator 100 includes second humidity sensor 1332, a second humidity value measured by second humidity sensor 1332 is compared to the second humidity set value to determine that a decrease in humidity level is needed in second compartment 104. For example, a decrease in humidity may be needed when the second humidity value is greater than the second humidity set value by a predefined humidity value that may be zero. The predefined humidity level may be defined as a percentage value and may be stored in control data 1314. As a result, the determination may or may not use the second humidity value measured by second humidity sensor 1332. When a decrease in humidity level is needed in second compartment 104, processing continues in an operation 1560. When a decrease in humidity level is not needed in second compartment 104, processing continues in an operation 1566.

In operation 1560, the second compressor run time determined in operation 1512 is decreased by a predefined amount. For example, the second compressor run time may be decreased based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate a decrease in second compressor run time for second compressor 1346 under various operating conditions.

In an operation 1562, the second compressor speed determined in operation 1510 is increased by a predefined amount. For example, the second compressor speed may be increased based on an operational mode of refrigerator 100, a predefined food storage type for second compartment 104 such as frozen, fresh food, crisper, etc., the temperature difference between the second temperature value and the second temperature set value, etc. For example, tables may be stored in control data 1314 to indicate an increase in second compressor speed for second compressor 1346 under various operating conditions.

In an operation 1564, second fan 704 is signaled to turn on. When second fan 704 is a variable speed fan, second fan 704 is signaled to turn on at the second fan speed determined in operation 1508.

In operation 1566, a flow of second refrigerant through second evaporator 700 is controlled to cool the air circulated through and by the second air circulation system based on a flow of refrigerant through second evaporator 700 and second compressor 1346 among other refrigeration components. Second compressor 1346 is signaled to turn on at the increased second compressor speed determined in operation 1562.

In an operation 1568, a second temperature value may be received that indicates a current temperature in second compartment 104. For example, the second temperature value may be received from second temperature sensor 1320 through input interface 1302 or communication interface 1306.

In an operation 1570, the second temperature value is compared to the second temperature set value.

Similar to operation 1528, in an operation 1572, a determination is made concerning whether or not cooling of second compartment 104 is ended based on the comparison in operation 1570. When cooling of second compartment 104 is not ended, processing continues in operation 1566. When cooling of second compartment 104 is ended, processing continues in an operation 1574.

In operation 1574, a determination is made concerning whether or not a decrease in humidity level was indicated in operation 1558. When a decrease in humidity level was indicated in operation 1558, processing continues in an operation 1576. When a decrease in humidity level was not indicated in operation 1558, processing continues in an operation 1588.

In an operation 1576, a start time is initialized for a humidity decrease state.

In an operation 1578, a second temperature set value may be received that indicates a change in the desired temperature set for second compartment 104. For example, the second temperature set value may be received from second temperature control 1322 through input interface 1302 or communication interface 1306 after receipt in operation 1402.

In an operation 1580, a second temperature value may be received that indicates a current temperature in second compartment 104. For example, the second temperature value may be received from second temperature sensor 1320 through input interface 1302 or communication interface 1306.

In an operation 1582, the second humidity set value may be received that indicates a change in the desired humidity set for second compartment 104. For example, the second humidity set value may be received from second humidity control 1334 through input interface 1302 or communication interface 1306 after receipt in operation 1408.

In an operation 1584, a second humidity value may be received that indicates a current humidity in second compartment 104. For example, the second humidity value may be received from second humidity sensor 1332 through input interface 1302 or communication interface 1306.

In an operation 1586, a determination is made concerning whether or not the humidity decrease state is ended. When the humidity decrease state is not ended, processing continues in operation 1578. When the humidity decrease state is ended, processing continues in operation 1588. For example, the humidity decrease state may be ended when the second temperature value is less than the second temperature set value by a predefined number of degrees that may be zero. As another example, the humidity decrease state may be ended when the second temperature value is greater than the second temperature set value by a predefined number of degrees that may be zero. As still another example, the humidity decrease state may be ended when a difference between a current time and the start time initialized in operation 1576 exceeds a predefined period of time that may be stored in control data 1314. As yet another example, the humidity decrease state may be ended when the second humidity value is less than the second humidity set value by a predefined value that may be zero and may be stored in control data 1314. As still another example, the humidity decrease state may be ended when the second humidity set value is changed by a user. For example, the user may increase the second humidity set value or may change the second humidity set value to indicate a higher humidity level using second humidity control 1334. As still another example, the humidity decrease state may be ended when a shared zone requires cooling. For example, third compartment 106 may require cooling. Occurrence of one or more of these events may trigger the humidity decrease state to end.

In operation 1588, second fan 704 and second compressor 1346 are signaled to turn off, and processing continues in operation 1400 to continue to monitor the state of each compartment.

Figure 16A:
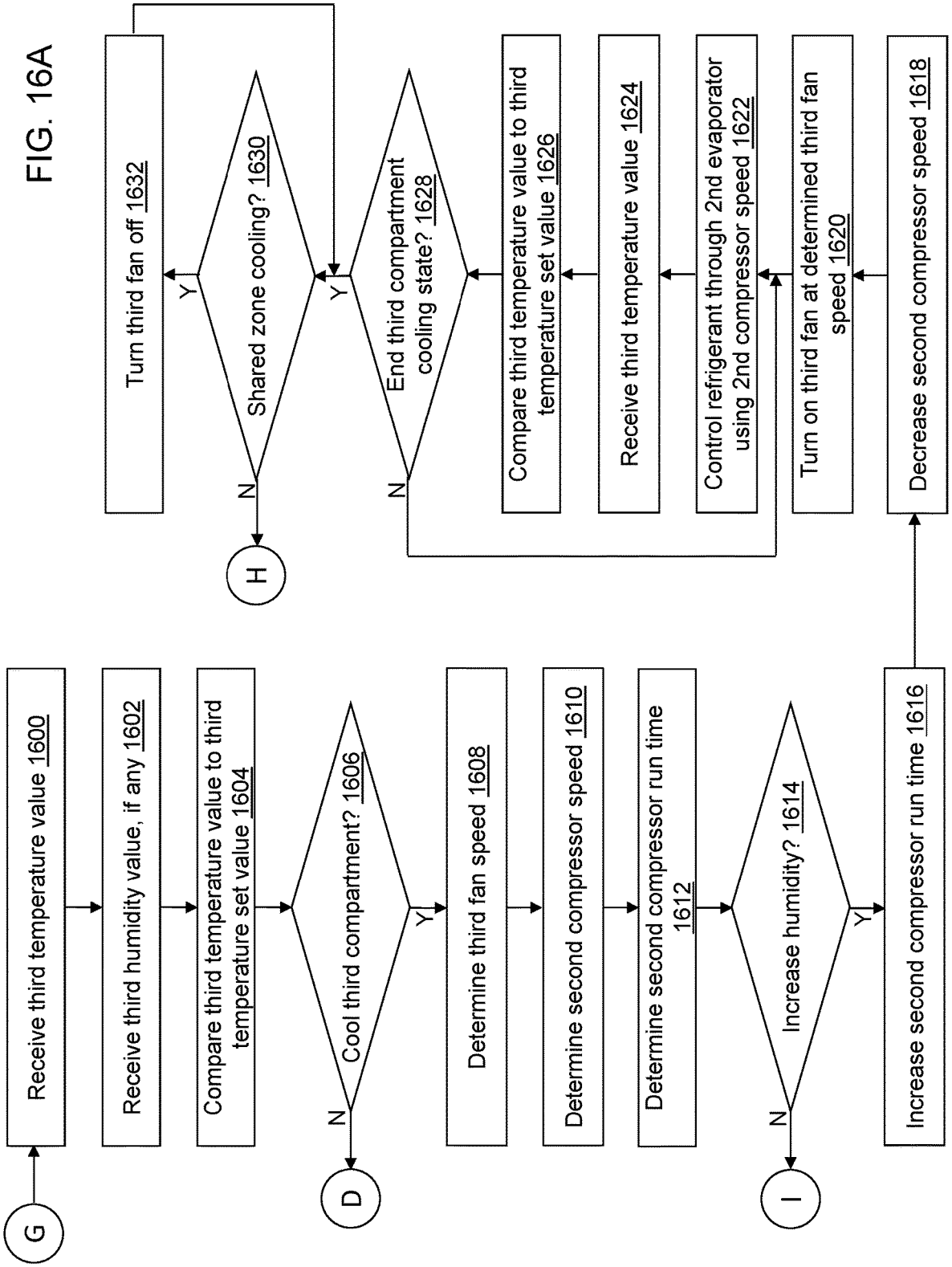

Referring to FIG. 16A, in operation 1600, a third temperature value may be received that indicates a current temperature in third compartment 106. For example, the third temperature value may be received from third temperature sensor 1324 through input interface 1302 or communication interface 1306.

In an operation 1602, a third humidity value may be received that indicates a current humidity in third compartment 106. For example, the third humidity value may be received from a third humidity sensor through input interface 1302 or communication interface 1306 though in the illustrative embodiment, refrigerator 100 and second refrigerator 1200 do not include a third humidity sensor.

In an operation 1604, the third temperature value is compared to the third temperature set value to determine if cooling is needed in third compartment 106.

In an operation 1606, a determination is made concerning whether or not cooling is needed in third compartment 106 based on the comparison in operation 1604. For example, cooling may be needed when the third temperature value is greater than or equal to the third temperature set value by a predefined number of degrees that may be zero. The predefined number of degrees may be in Fahrenheit or Celsius and may be stored in control data 1314. When cooling is needed in third compartment 106, processing continues in an operation 1608. When cooling is not needed in third compartment 106, processing continues in an operation 1400 shown referring to FIG. 14A to continue to monitor the state of each compartment.

In operation 1608, a third fan speed is determined when third fan 800 is a variable speed fan. For example, the third fan speed may be selected based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate a third fan speed for third fan 800 under various operating conditions.

In an operation 1610, a second compressor speed is determined when second compressor 1346 is a variable speed compressor. For example, the second compressor speed may be selected based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate a second compressor speed for second compressor 1346 under various operating conditions.

In an operation 1612, a second compressor run time is determined for second compressor 1346. For example, the second compressor run time may be selected based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate a second compressor run time for second compressor 1346 under various operating conditions.

In an operation 1614, a determination is made concerning whether or not an increase in humidity level is needed in third compartment 106. For example, when the user selects third humidity control 1336 it may indicate that the humidity level be increased, which results in a determination that an increase in humidity level is needed in third compartment 106. Alternatively, when refrigerator 100 includes the third humidity sensor, a third humidity value measured by the third humidity sensor is compared to the third humidity set value to determine that an increase in humidity level is needed in third compartment 106. For example, an increase in humidity may be needed when the third humidity value is less than or equal to the third humidity set value by a predefined humidity value that may be zero. The humidity level may be defined as a percentage value that may be stored in control data 1314. As a result, the determination may or may not use the third humidity value measured by the third humidity sensor. When an increase in humidity level is needed in third compartment 106, processing continues in an operation 1616. When an increase in humidity level is not needed in third compartment 106, processing continues in an operation 1658 shown referring to FIG. 16C.

In operation 1616, the second compressor run time determined in operation 1612 is increased by a predefined amount. For example, the second compressor run time may be increased based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate an increase in second compressor run time for second compressor 1346 under various operating conditions.

In an operation 1618, the second compressor speed determined in operation 1610 is decreased by a predefined amount. For example, the second compressor speed may be decreased based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate a decrease in second compressor speed for second compressor 1346 under various operating conditions.

In an operation 1620, third fan 800 is signaled to turn on. When third fan 800 is a variable speed fan, third fan 800 is signaled to turn on at the third fan speed determined in operation 1608.

In an operation 1622, a flow of second refrigerant through second evaporator 700 is controlled to cool the air circulated through and by the third air circulation system based on a flow of refrigerant through second evaporator 700 and second compressor 1346 among other refrigeration components. Second compressor 1346 is signaled to turn on at the decreased second compressor speed determined in operation 1610.

In an operation 1624, a third temperature value may be received that indicates a current temperature in third compartment 106. For example, the third temperature value may be received from third temperature sensor 1324 through input interface 1302 or communication interface 1306.

In an operation 1626, the third temperature value is compared to the third temperature set value.

In an operation 1628, a determination is made concerning whether or not cooling of third compartment 106 is ended based on the comparison in operation 1626. For example, cooling may be ended when the third temperature value is less than or equal to the third temperature set value by a predefined number of degrees that may be zero. The predefined number of degrees may be in Fahrenheit or Celsius and may be stored in control data 1314. When cooling of third compartment 106 is not ended, processing continues in operation 1622. When cooling of third compartment 106 is ended, processing continues in an operation 1630.

In an operation 1630, a determination is made concerning whether or not third compartment 106 is a zone that shares a refrigeration system with another compartment that is also cooling and therefore using second compressor 1346 and/or second evaporator 700. When third compartment 106 is a zone that shares a refrigeration system with another compartment that is cooling, processing continues in operation 1632. When third compartment 106 is not a zone that shares a refrigeration system or the compartment that shares the refrigeration system is not cooling, processing continues in an operation 1634 shown referring to FIG. 16B.

In operation 1632, third fan 800 is signaled to turn off, and processing continues in operation 1630 until the shared zone(s) are no longer cooling. If third fan 800 continued to run while a shared zone was cooling, the humidity in the zone may decrease rather than increase.

Referring to FIG. 16B, in operation 1634, second compressor 1346 is signaled to turn off once all of the shared zones are no longer cooling.

In operation 1636, the fans of all of the shared zones, if any, are signaled to turn on. For example, in the illustrative embodiment, second compartment 104 and third compartment 106 are shared zones. As a result, third fan 800 is signaled to turn on at the third fan speed determined in operation 1612, and second fan 704 is signaled to turn on at the second fan speed determined in operation 1512. As another option only certain evaporator fans are turned on to target humidity increases in specific areas of refrigerator 100 or second refrigerator 1200.

In an operation 1638, a start time is initialized for a humidity increase state for third compartment 106.

When second compartment 104 and third compartment 106 are shared zones, in an operation 1640, a second temperature set value may be received that indicates a change in the desired temperature set for second compartment 104. For example, the second temperature set value may be received from second temperature control 1322 through input interface 1302 or communication interface 1306 after receipt in operation 1402.

When second compartment 104 and third compartment 106 are shared zones, in an operation 1642, the second temperature value may be received that indicates a current temperature in second compartment 104. For example, the second temperature value may be received from second temperature sensor 1320 through input interface 1302 or communication interface 1306.

When second compartment 104 and third compartment 106 are shared zones, in an operation 1644, the second humidity set value may be received that indicates a change in the desired humidity set for second compartment 104. For example, the second humidity set value may be received from second humidity control 1334 through input interface 1302 or communication interface 1306 after receipt in operation 1408.

When second compartment 104 and third compartment 106 are shared zones, in an operation 1646, a second humidity value may be received that indicates a current humidity in second compartment 104. For example, the second humidity value may be received from second humidity sensor 1332 through input interface 1302 or communication interface 1306.

In an operation 1648, the third temperature set value may be received that indicates a change in the desired temperature set for third compartment 106. For example, the third temperature set value may be received from third temperature control 1326 through input interface 1302 or communication interface 1306 after receipt in operation 1404.

In an operation 1650, the third temperature value may be received that indicates a current temperature in third compartment 106. For example, the third temperature value may be received from third temperature sensor 1324 through input interface 1302 or communication interface 1306.

In an operation 1652, the third humidity set value may be received that indicates a change in the desired humidity set for third compartment 106. For example, the third humidity set value may be received from third humidity control 1336 through input interface 1302 or communication interface 1306 after receipt in operation 1409. A third humidity value is not received in the illustrative embodiment because refrigerator 100 does not include the third humidity sensor.

In an operation 1654, a determination is made concerning whether or not the humidity increase state is ended. When the humidity increase state is not ended, processing continues in operation 1640. When the humidity increase state is ended, processing continues in an operation 1656.

For example, the humidity increase state may be ended when the third temperature value is greater than the third temperature set value by a predefined number of degrees that may be zero. As another example, the humidity increase state may be ended when the third temperature value is less than the third temperature set value by a predefined number of degrees that may be zero. As still another example, the humidity increase state may be ended when a difference between a current time and the start time initialized in operation 1638 exceeds a predefined period of time that may be stored in control data 1314. As yet another example, the humidity increase state may be ended when the third humidity value is greater than the third humidity set value by a predefined value that may be zero and may be stored in control data 1314. As still another example, the humidity increase state may be ended when the third humidity set value is changed by a user. For example, the user may decrease the third humidity set value or may change the third humidity set value to indicate a lower humidity level. As still another example, the humidity increase state may be ended when a shared zone requires cooling. For example, second compartment 104 may require cooling. Occurrence of one or more of these events may trigger the humidity increase state to end.

In operation 1656, all of the shared zone fans such as second fan 704 and third fan 800 are signaled to turn off, and processing continues in operation 1400 to continue to monitor the state of each compartment.

Figure 16C:
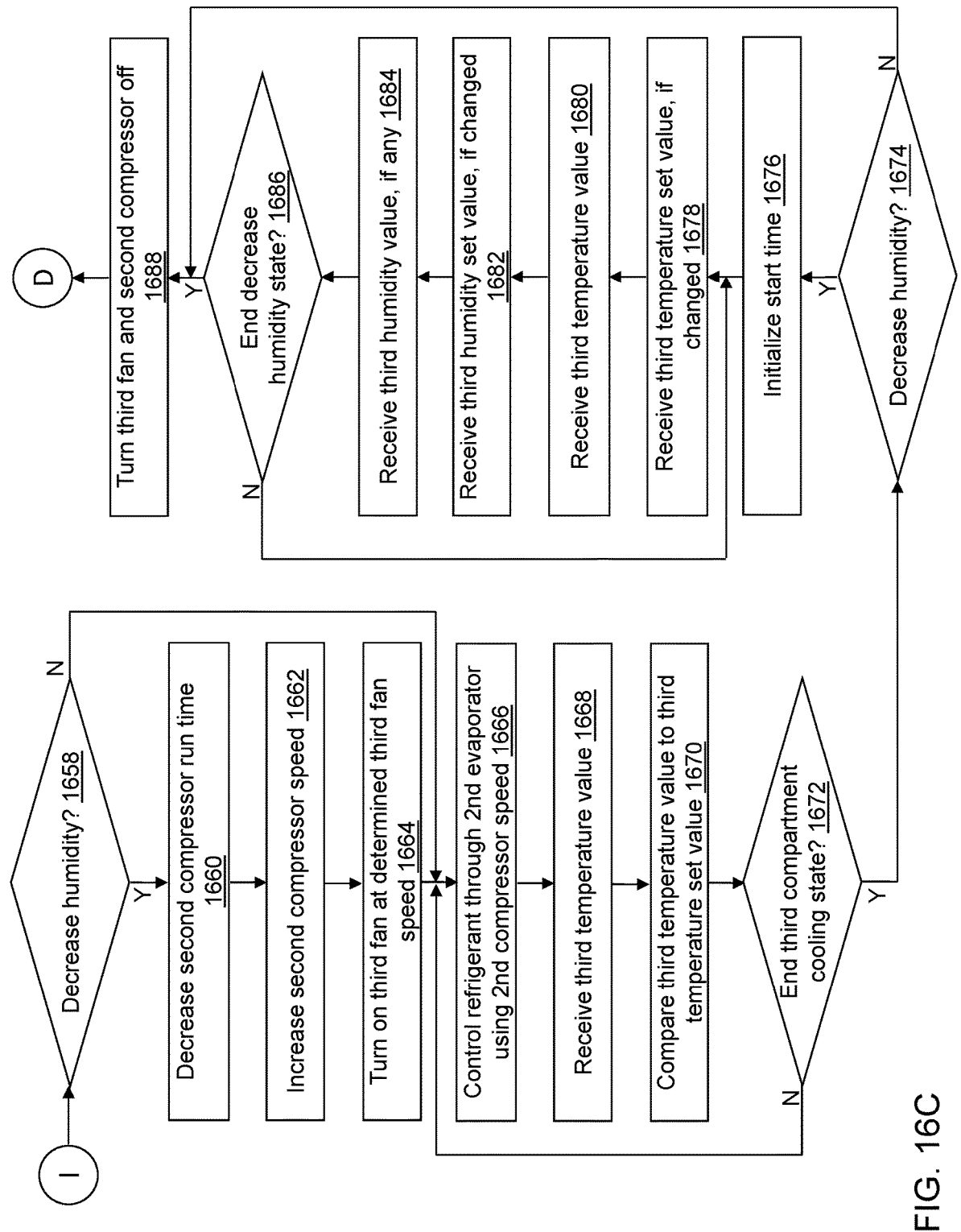

Referring to FIG. 16C, in operation 1658, a determination is made concerning whether or not a decrease in humidity level is needed in third compartment 106. For example, when the user selects third humidity control 1336 it may indicate that the humidity level be decreased, which results in a determination that a decrease in humidity level is needed in third compartment 106. Alternatively, when refrigerator 100 includes the third humidity sensor, a third humidity value measured by the third humidity sensor is compared to the third humidity set value to determine that a decrease in humidity level is needed in third compartment 106. For example, a decrease in humidity may be needed when the third humidity value is greater than the third humidity set value by a predefined humidity value that may be zero. The predefined humidity level may be defined as a percentage value and may be stored in control data 1314. As a result, the determination may or may not use the third humidity value measured by the third humidity sensor. When a decrease in humidity level is needed in third compartment 106, processing continues in an operation 1660. When a decrease in humidity level is not needed in third compartment 106, processing continues in an operation 1666.

In operation 1660, the second compressor run time determined in operation 1612 is decreased by a predefined amount. For example, the second compressor run time may be decreased based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate a decrease in second compressor run time for second compressor 1346 under various operating conditions.

In an operation 1662, the second compressor speed determined in operation 1610 is increased by a predefined amount. For example, the second compressor speed may be increased based on an operational mode of refrigerator 100, a predefined food storage type for third compartment 106 such as frozen, fresh food, crisper, etc., the temperature difference between the third temperature value and the third temperature set value, etc. For example, tables may be stored in control data 1314 to indicate an increase in second compressor speed for second compressor 1346 under various operating conditions.

In an operation 1664, third fan 800 is signaled to turn on. When third fan 800 is a variable speed fan, third fan 800 is signaled to turn on at the third fan speed determined in operation 1608.

In operation 1666, a flow of second refrigerant through second evaporator 700 is controlled to cool the air circulated through and by the third air circulation system based on a flow of refrigerant through second evaporator 700 and second compressor 1346 among other refrigeration components. Second compressor 1346 is signaled to turn on at the increased second compressor speed determined in operation 1662.

In an operation 1668, the third temperature value may be received that indicates a current temperature in third compartment 106. For example, the third temperature value may be received from third temperature sensor 1324 through input interface 1302 or communication interface 1306.

In an operation 1670, the third temperature value is compared to the third temperature set value.

Similar to operation 1628, in an operation 1672, a determination is made concerning whether or not cooling of third compartment 106 is ended based on the comparison in operation 1670. When cooling of third compartment 106 is not ended, processing continues in operation 1666. When cooling of third compartment 106 is ended, processing continues in an operation 1674.

In operation 1674, a determination is made concerning whether or not a decrease in humidity level was indicated in operation 1658. When a decrease in humidity level was indicated in operation 1658, processing continues in an operation 1676. When a decrease in humidity level was not indicated in operation 1658, processing continues in an operation 1688.

In an operation 1676, a start time is initialized for a humidity decrease state for third compartment 106.

In an operation 1678, a third temperature set value may be received that indicates a change in the desired temperature set for third compartment 106. For example, the third temperature set value may be received from third temperature control 1326 through input interface 1302 or communication interface 1306 after receipt in operation 1402.

In an operation 1680, a third temperature value may be received that indicates a current temperature in third compartment 106. For example, the third temperature value may be received from third temperature sensor 1324 through input interface 1302 or communication interface 1306.

In an operation 1682, the third humidity set value may be received that indicates a change in the desired humidity set for third compartment 106. For example, the third humidity set value may be received from third humidity control 1336 through input interface 1302 or communication interface 1306 after receipt in operation 1409.

In an operation 1684, a third humidity value may be received that indicates a current humidity in third compartment 106. For example, the third humidity value may be received from the third humidity sensor through input interface 1302 or communication interface 1306 though, in the illustrative embodiment, neither refrigerator 100 or second refrigerator 1200 include the third humidity sensor.

In an operation 1686, a determination is made concerning whether or not the humidity decrease state for third compartment 106 is ended. When the humidity decrease state is not ended, processing continues in operation 1678. When the humidity decrease state is ended, processing continues in operation 1688. For example, the humidity decrease state may be ended when the third temperature value is less than the third temperature set value by a predefined number of degrees that may be zero. As another example, the humidity decrease state may be ended when the third temperature value is greater than the third temperature set value by a predefined number of degrees that may be zero. As still another example, the humidity decrease state may be ended when a difference between a current time and the start time initialized in operation 1676 exceeds a predefined period of time that may be stored in control data 1314. As yet another example, the humidity decrease state may be ended when the third humidity value is less than the third humidity set value by a predefined value that may be zero and may be stored in control data 1314. As still another example, the humidity decrease state may be ended when the third humidity set value is changed by a user. For example, the user may increase the third humidity set value or may change the third humidity set value to indicate a higher humidity level using third humidity control 1336. As still another example, the humidity decrease state may be ended when a shared zone requires cooling. For example, second compartment 104 may require cooling. Occurrence of one or more of these events may trigger the humidity decrease state to end.

In operation 1688, third fan 800 and second compressor 1346 are signaled to turn off, and processing continues in operation 1400 to continue to monitor the state of each compartment.

In an illustrative embodiment, a flow of refrigerant through second evaporator 700 is controlled to cool the air circulated through the second air circulation system and/or the through third air circulation system. When both second compartment 104 and third compartment 106 need cooling, a highest compressor speed may be selected from the second compressor speed determined in operation 1510 and the second compressor speed determined in operation 1610.

Either or both of third fan 800 and second fan 704 may be operated to defrost second evaporator 700. Any resulting condensation is received by evaporator condensation tray 316 mounted below second evaporator 700 and routed to an exterior of refrigerator body 300 through drain port 204.

When third fan 800 is on and second fan 704 is off, some air may be drawn upward through second compartment return duct 709 and into third compartment return duct 1102 from second compartment 104. Similarly, when third fan 800 is off and second fan 704 is on, some air may be drawn through the plurality of vents formed through third compartment back plate 400 and into third compartment return duct 1102 from third compartment 106. Thus, the second air circulation system and the third air circulation system share third compartment return duct 1102 and second evaporator 700 and influence each other to some extent.

Though FIGS. 14A to 14C, 15A to 15C, and 16A to 16C show sequential processing, new temperature set values and/or humidity set values as well as any other control set values and updated temperature values and humidity values as well as any other sensor measurements may be received at any time, which may trigger a repeat of some operations, a jump to a different operation, etc. Additionally, as already indicated, refrigerator controller 1300 may perform various operations in parallel, for example, to respond to changes associated with any compartment.

Figure 17:
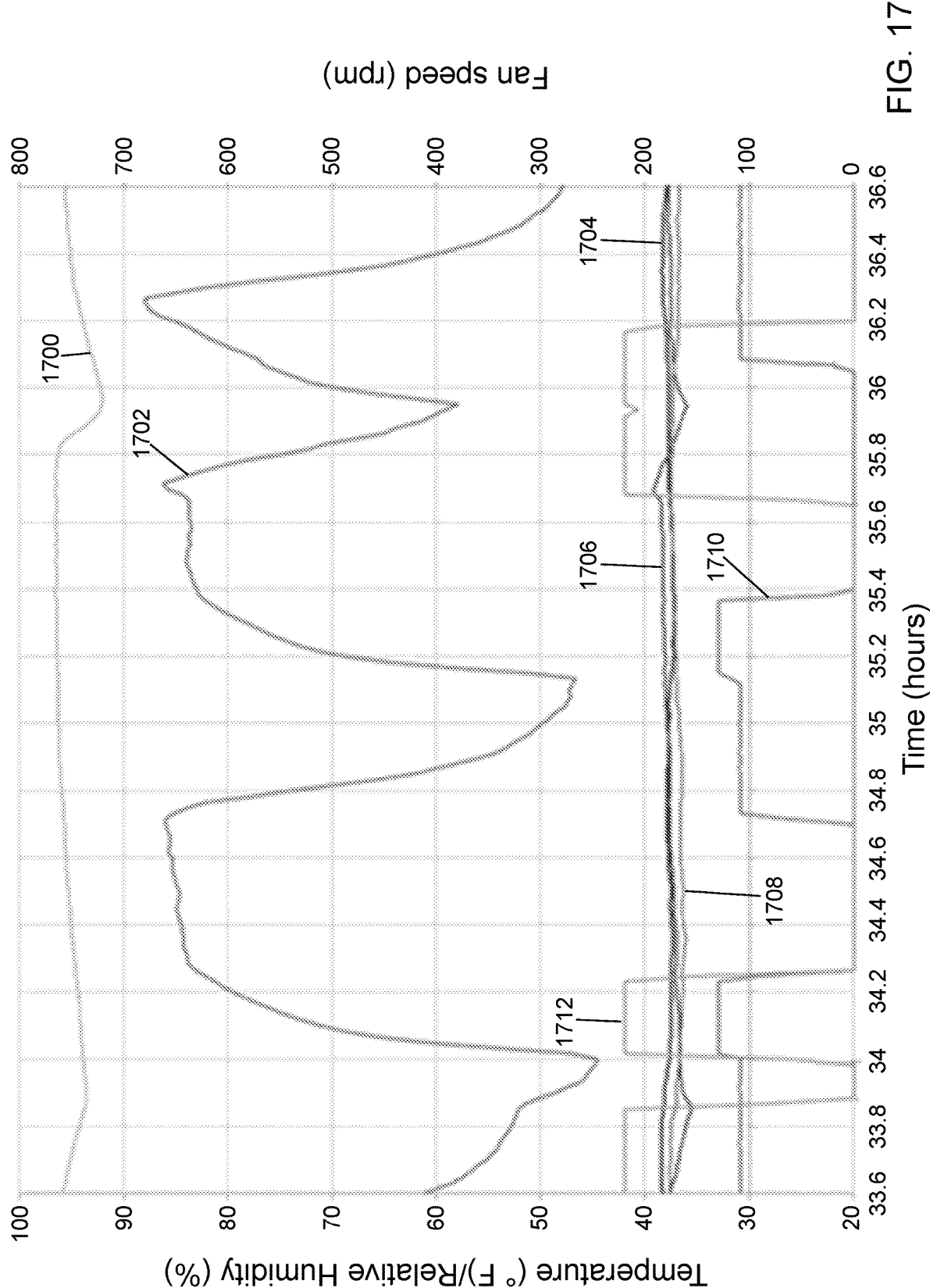
FIG. 17 depicts variations in temperature within a refrigerator based on fan operation in accordance with an illustrative embodiment of the refrigerator controller of FIG. 13.

Referring to FIG. 17, variations in temperature within the refrigerated compartment of second refrigerator 1200 based on operation of second fan 704 and of third fan 800 are shown in accordance with an illustrative embodiment of refrigerator controller 1300. The predefined number of degrees of 10° F. above the second temperature set value and the predefined period of time of 15 minutes were used as events to end the humidity increase state.

A first relative humidity curve 1700 shows a variation in relative humidity measured as a function of time by a humidity sensor in a crisper drawer area such as surrounding drawers 1222 in the lower portion of the refrigerated compartment of second refrigerator 1200 for illustration. A second relative humidity curve 1702 shows a variation in relative humidity measured as a function of time by a humidity sensor near a glass shelf such as surrounding one of the shelves 1220 in a center portion of the refrigerated compartment of second refrigerator 1200 for illustration. The relative humidity values are shown on the left axis.

A first temperature curve 1704 shows a variation in temperature measured by a temperature sensor as a function of time on a glass shelf just above a stack of crisper drawers. A second temperature curve 1706 shows a variation in temperature measured by a temperature sensor as a function of time in a top drawer of the stack of crisper drawers. A third temperature curve 1708 shows a variation in temperature measured by a temperature sensor as a function of time in another drawer of the stack of crisper drawers. The temperature values are shown on the left axis.

A first fan speed curve 1710 shows a variation in fan speed as a function of time for third fan 800. A second fan speed curve 1712 shows a variation in fan speed as a function of time for second fan 704. The fan revolutions per minute (rpm) values are shown on the right axis.

A timeline for occurrence of the transitions is summarized below:

33.6 hours=upper and lower refrigerator zones cooling.
33.86567 hours=Lower refrigerator zone satisfies cooling requirement and moves to humidity assist wait while the upper zone continues to cool.
33.99899 hours=Upper refrigerator zone satisfies cooling requirement.

Both upper and lower refrigerator zones begin humidity increase.

34.24898 hours=Upper and lower refrigerator zones reach predefined set period of time of 15 minutes (achieves 15 minutes before reaching the 10° F. increase in temperature) and both upper and lower refrigerators zones move to idle state.
34.71562 hours=Upper refrigerator zone begins cooling of zone due to temperature rising to a value that required cooling.
35.13226 hours=Upper refrigerator zone satisfies cooling requirement.

Since lower zone is already in idle state, humidity increase begins.

35.38225 hours=Upper refrigerator zone reaches predefined set period of time of 15 minutes (achieves 15 minutes before reaching the 10° F. increase in temperature) and upper refrigerator zone moves to idle state.
35.69889 hours=Lower refrigerator zone begins cooling of zone due to temperature rising to a value that required cooling.
35.93237 hours=Lower refrigerator zone satisfies cooling requirement.

Since upper zone is already in idle state, humidity increase begins.

36.19916 hours=Lower refrigerator zone reaches predefined set period of time of 15 minutes (achieves 15 minutes before reaching the 10° F. increase in temperature) and lower refrigerator zone moves to idle state.

Figure 18:
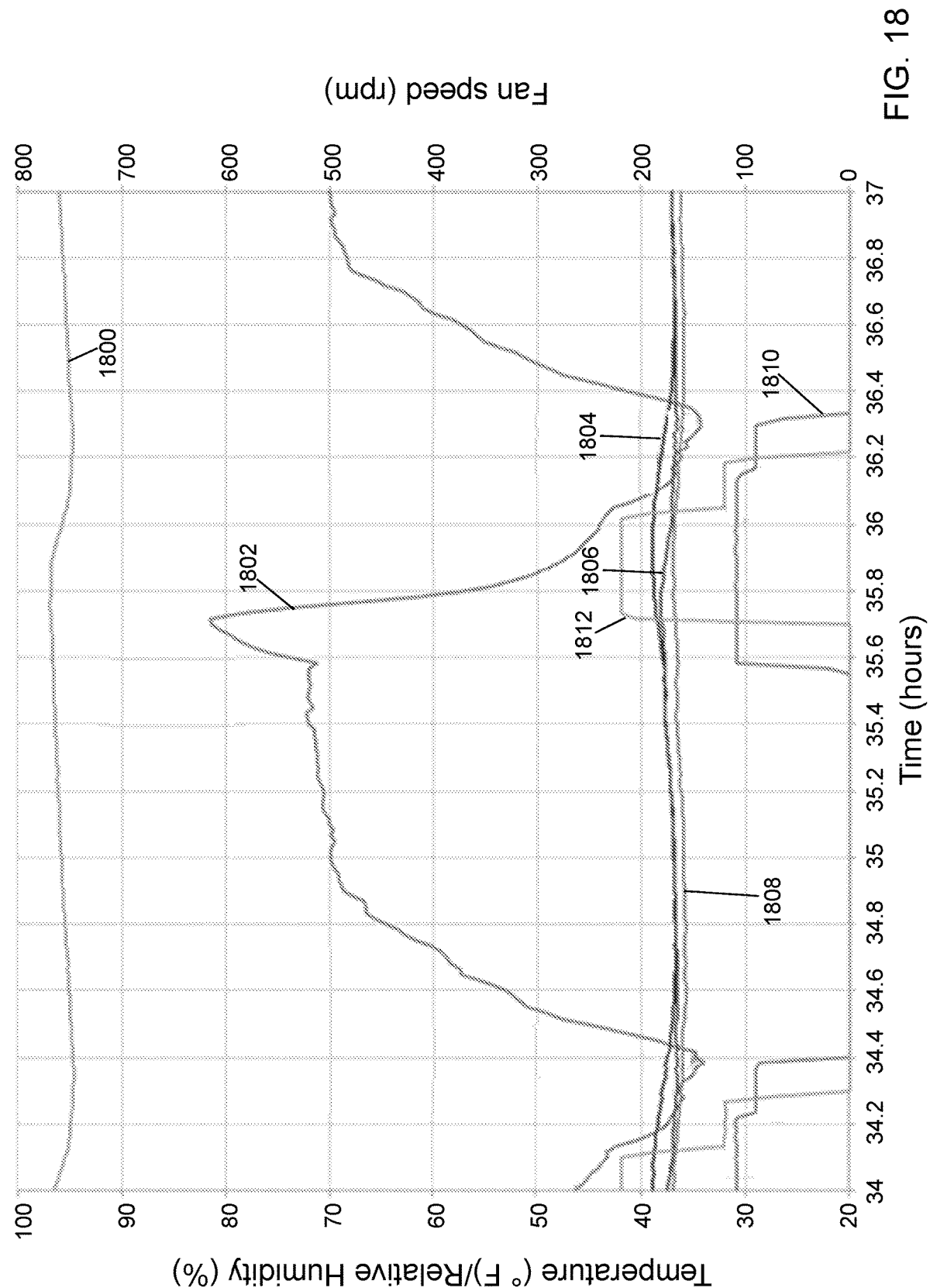
FIG. 18 depicts variations in temperature within a refrigerator based on fan operation in accordance with an illustrative embodiment of the refrigerator controller of FIG. 13.

Referring to FIG. 18, variations in temperature within the refrigerated compartment of second refrigerator 1200 based on operation of second fan 704 and of third fan 800 are shown in accordance with an illustrative embodiment of refrigerator controller 1300. The predefined number of degrees of 10° F. below the second temperature set value and the predefined period of time of 10 minutes were used as events to end the humidity decrease state.

A first relative humidity curve 1800 shows a variation in relative humidity measured as a function of time by a humidity sensor in a crisper drawer in the lower portion of the refrigerated compartment of second refrigerator 1200 for illustration. A second relative humidity curve 1802 shows a variation in relative humidity measured as a function of time by a humidity sensor near a glass shelf such as surrounding one of the shelves 1220 in a center portion of the refrigerated compartment of second refrigerator 1200 for illustration. The humidity values are shown on the left axis.

A first temperature curve 1804 shows a variation in temperature measured as a function of time by a temperature sensor on a glass shelf. A second temperature curve 1806 shows a variation in temperature measured as a function of time by a temperature sensor in a top drawer of a drawer stack. A third temperature curve 1808 shows a variation in temperature measured as a function of time by a temperature sensor in another drawer of the drawer stack. The temperature values are shown on the left axis.

A first fan speed curve 1810 shows a variation in fan speed as a function of time for third fan 800. A second fan speed curve 1812 shows a variation in fan speed as a function of time for second fan 704. The fan speed values are shown on the right axis.

A timeline for occurrence of the transitions is summarized below:
- 34.0 hours=upper and lower refrigerator zones cooling.
- 34.11593 hours=Lower refrigerator zone satisfies cooling requirement and enters humidity decrease. Upper refrigerator zone continues to cool zone.
- 34.21592 hours=Upper refrigerator zone satisfies cooling requirement and enters humidity decrease. Lower zone continues to run humidity decrease.
- 34.28258 hours=Lower refrigerator zone reaches predefined set period of time of 10 minutes (achieves 10 minutes before reaching the 10° F. decrease in temperature) and lower refrigerator zone moves to idle state. Upper refrigerator zone continues to run humidity decrease.
- 34.38259 hours=Upper refrigerator zone reaches predefined set period of time of 10 minutes (achieves 10 minutes before reaching the 10° F. decrease in temperature) and upper refrigerator zone moves to idle state. Lower refrigerator zone continues to remain in idle state.
- 35.56590 hours=Upper refrigerator zone reaches temperature that requires cooling and enters defrost assist mode to ensure the evaporator temperature is clear of ice. Lower refrigerator zone remains in idle state.
- 35.71589 hours=Upper refrigerator and lower refrigerator zones begin cooling.
- 36.03254 hours=Lower refrigerator zone satisfies cooling requirement and enters humidity decrease. Upper refrigerator zone continues to cool zone.
- 36.14922 hours=Upper refrigerator zone satisfies cooling requirement and enters humidity decrease. Lower zone continues to run humidity decrease.
- 36.19922 hours=Lower refrigerator zone reaches predefined set period of time of 10 minutes (achieves 10 minutes before reaching the 10° F. decrease in temperature) and lower refrigerator zone moves to idle state. Upper refrigerator zone continues to run humidity decrease.
- 36.31589 hours=Upper refrigerator zone reaches predefined set period of time of 10 minutes (achieves 10 minutes before reaching the 10° F. decrease in temperature) and upper refrigerator zone moves to idle state. Lower refrigerator zone continues to remain in idle state.

Refrigerator controller 1300 provides a user-configurable humidity control of refrigeration zones by modifying operation of first fan 1342, second fan 704, and third fan 800 and an associated compressor behavior during a cooling cycle and after the cooling cycle has ended. Refrigerator controller 1300 can be configured for open-loop (without the humidity sensor) or closed-loop (with a humidity sensor) control as described above for illustration. Refrigerator controller 1300 supports humidity control for multiple zones (e.g., first compartment 102, second compartment 104, and third compartment 106) as well as one or more shared zones with independent evaporator fans (e.g., second fan 704 and third fan 800), that share a common compressor and evaporator (e.g., second compartment 104 and third compartment 106 that share second compressor 1346 and second evaporator 700). Refrigerator controller 1300 considers shared zones and prevents one zone from causing an unintended humidity change in a dependent zone. Refrigerator controller 1300 allows the user to increase or decrease the humidity in refrigeration zones using an appliance user interface module or mobile application.

For the humidity increase state, during zone cooling, refrigerator controller 1300 decreases the normal compressor speed and increases the normal cooling cycle run time to allow additional moisture to accumulate on the associated evaporator while the associated compressor is running. When the cooling rate is reduced, the evaporator is warmer and wetter. Once the zone reaches the associated temperature set value, the associated compressor is signaled to turn off, but the associated fan continues to run to direct moist air from the associated evaporator into the zone, thereby increasing the humidity in the zone. For zones that share an evaporator with another zone, the zone is signaled to turn off its associated fan when the zone reaches the associated temperature set value and waits until any shared zone(s) finish cooling. Once that occurs, the shared compressor is signaled to turn off, and the fans associated with the shared zones are signaled to turn on to increase the humidity in the zone until an event triggers the humidity increase state to end.

For the humidity decrease state, during zone cooling, refrigerator controller 1300 increases the normal compressor speed and decreases the normal cooling cycle run time to reduce the moisture that accumulates on the associated evaporator while the associated compressor is running. When the cooling rate is increased, the evaporator is colder and dryer. Once the zone reaches the associated temperature set value, the associated compressor and the associated fan continue to run to continue to remove moisture from the refrigerator air through the associated evaporator, thereby decreasing the humidity in the zone until an event triggers the humidity decrease state to end. For zones that share an evaporator with another zone, each zone enters and exits the humidity decrease state independently.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a controller cause the controller to:
receive a first temperature value from a first temperature sensor, wherein the first temperature value is a measure of a first temperature within a first enclosed space;
receive a first temperature set value for the first enclosed space, wherein the first temperature set value is a desired first temperature value for the first enclosed space;
receive a first humidity set value for the first enclosed space, wherein the first humidity set value is a desired first humidity level for the first enclosed space;
when it is determined to cool the first enclosed space based on a first comparison between the received first temperature value and the received first temperature set value,
determine a first compressor speed for a first compressor;
determine a first compressor run time for the first compressor;
when it is determined to increase a humidity of the first enclosed space based on the received first humidity set value,
decrease the first compressor speed relative to the first compressor speed determined for the first compressor;
increase the first compressor run time relative to the first compressor run time determined for the first compressor;
control a first fan on, wherein the first fan is configured to direct air through a first evaporator into the first enclosed space;
(A) control a flow of refrigerant from the first compressor through a coil of the first evaporator based on the decreased first compressor speed and the increased first compressor run time;
(B) receive a next first temperature value from the first temperature sensor;
(C) when it is determined to stop cooling the first enclosed space based on a second comparison between the next first temperature value and the received first temperature set value,
control the first compressor to turn off;
determine when to end an increase humidity state; and
control the first fan to turn off when it is determined to end the increase humidity state; and
repeat (A) to (C) until it is determined to stop cooling the first enclosed space based on the second comparison.

2. The non-transitory computer-readable medium of claim 1, wherein the computer-readable instructions further cause the controller to determine a fan speed before controlling the first fan on, wherein the first fan is further controlled to operate at the determined fan speed.

3. The non-transitory computer-readable medium of claim 1, wherein the first compressor speed is determined based on the first comparison.

4. The non-transitory computer-readable medium of claim 1, wherein the desired first humidity level is an indicator to increase the first humidity level.

5. The non-transitory computer-readable medium of claim 1, wherein the desired first humidity level is an indicator to increase the first humidity level to a specific humidity value.

6. The non-transitory computer-readable medium of claim 1, wherein the determination to end the increase humidity state is based on a predefined period of time value after controlling the first compressor to turn off, wherein the predefined period of time value is greater than zero.

7. The non-transitory computer-readable medium of claim 1, wherein the determination to end the increase humidity state comprises:
receiving a first humidity value from a humidity sensor, wherein the first humidity value is a measure of a first humidity within the first enclosed space; and
comparing the received first humidity value to the received first humidity set value,
wherein the increase humidity state is determined to end when the received first humidity value is greater than or equal to the received first humidity set value.

8. The non-transitory computer-readable medium of claim 1, wherein the determination to end the increase humidity state comprises:
receiving a second humidity set value for the first enclosed space,
wherein the increase humidity state is determined to end when the second humidity set value is less than the received first humidity value.

9. The non-transitory computer-readable medium of claim 1, wherein the determination to end the increase humidity state comprises:
(D) continuing to receive the next first temperature value from the first temperature sensor; and
comparing the next first temperature value received in (D) to the received first temperature set value,
wherein the increase humidity state is determined to end when the next first temperature value received in (D) is greater than the received first temperature set value or when the next first temperature value received in (D) is less than the received first temperature set value.

10. The non-transitory computer-readable medium of claim 9, wherein the increase humidity state is determined to end when the received next first temperature value is greater than the received first temperature set value by a predefined number of degrees.

11. The non-transitory computer-readable medium of claim 1, wherein the computer-readable instructions further cause the controller to:
when it is determined to cool the first enclosed space based on the first comparison between the received first temperature value and the received first temperature set value and when it is determined to decrease the humidity of the first enclosed space based on the received first humidity set value,
increase the first compressor speed relative to the first compressor speed determined for the first compressor;
decrease the first compressor run time relative to the first compressor run time determined for the first compressor;
control the first fan on;
(D) control the flow of refrigerant from the first compressor through the coil of the first evaporator based on the increased first compressor speed and the decreased first compressor run time;
(E) receive the next first temperature value from the first temperature sensor;
(F) when it is determined to stop cooling the first enclosed space based on a third comparison between the next first temperature value and the received first temperature set value, determine when to end a decrease humidity state; and control the first fan to turn off and control the first compressor to turn off when it is determined to end the decrease humidity state; and repeat (D) to (F) until it is determined to stop cooling the first enclosed space based on the third comparison.

12. The non-transitory computer-readable medium of claim 11, wherein the computer-readable instructions further cause the controller to:

when it is determined to cool the first enclosed space based on the first comparison between the received first temperature value and the received first temperature set value and when it is determined not to increase the humidity and not to decrease the humidity of the first enclosed space based on the received first humidity set value, control the first fan on;

(G) control the flow of refrigerant from the first compressor through the coil of the first evaporator based on the determined first compressor speed and the determined first compressor run time;

(H) receive the next first temperature value from the first temperature sensor;

(I) when it is determined to stop cooling the first enclosed space based on a fourth comparison between the next first temperature value and the received first temperature set value, control the first fan to turn off and control the first compressor to turn off; and repeat (G) to (I) until it is determined to stop cooling the first enclosed space based on the fourth comparison.

13. The non-transitory computer-readable medium of claim 11, wherein the desired first humidity level is an indicator to decrease the first humidity level.

14. The non-transitory computer-readable medium of claim 11, wherein the desired first humidity level is an indicator to decrease the first humidity level to a specific humidity value.

15. The non-transitory computer-readable medium of claim 1, wherein after (C) and before controlling the first compressor to turn off and before determining when to end the increase humidity state, the computer-readable instructions further cause the controller to:

determine if a second zone is cooling, wherein the second zone is cooled by controlling the flow of refrigerant from the first compressor through the coil of the first evaporator based on the decreased first compressor speed and by directing air through the first evaporator into a second space using a second fan; and when the second zone is determined to be cooling, control the first fan to turn off; and when the second zone is no longer cooling, control the first fan and the second fan to turn on, wherein the second fan is controlled to turn off when it is determined to end the increase humidity state.

16. The non-transitory computer-readable medium of claim 15, wherein the second space is a second enclosed space separate from the first enclosed space.

17. The non-transitory computer-readable medium of claim 15, wherein the second space is within the first enclosed space.

18. The non-transitory computer-readable medium of claim 1, wherein the first compressor speed is determined based on the determined first compressor run time.

19. A refrigerator comprising:
a first evaporator;
a first compressor;
a refrigerator controller;
a first compartment comprising
a first plurality of walls;
a first compartment access structure configured to provide access to a first enclosed space defined by the first plurality of walls and the first compartment access structure; and
a first temperature sensor configured to measure a first temperature value of air in the first enclosed space and to send the measured first temperature value to the refrigerator controller;
a first fan configured to direct air into the first enclosed space when turned on; and
the refrigerator controller comprising
a processor; and
a computer-readable medium operably coupled to the processor, the computer-readable medium having computer-readable instructions stored thereon that, when executed by the processor, cause the refrigerator controller to
receive the first temperature value from the first temperature sensor, wherein the first temperature value is a measure of a first temperature within the first enclosed space;
receive a first temperature set value for the first enclosed space, wherein the first temperature set value is a desired first temperature value for the first enclosed space;
receive a first humidity set value for the first enclosed space, wherein the first humidity set value is a desired first humidity level for the first enclosed space;
when it is determined to cool the first enclosed space based on a first comparison between the received first temperature value and the received first temperature set value,
determine a first compressor speed for the first compressor;
determine a first compressor run time for the first compressor;
when it is determined to increase a humidity of the first enclosed space based on the received first humidity set value,
decrease the first compressor speed relative to the first compressor speed determined for the first compressor;
increase the first compressor run time relative to the first compressor run time determined for the first compressor;
control the first fan on, wherein the first fan is configured to direct air through the first evaporator into the first enclosed space;
(A) control a flow of refrigerant from the first compressor through a coil of the first evaporator based on the decreased first compressor speed and the increased first compressor run time;
(B) receive a next first temperature value from the first temperature sensor;
(C) when it is determined to stop cooling the first enclosed space based on a second comparison between the next first temperature value and the received first temperature set value, control the first compressor to turn off;
determine when to end an increase humidity state; and
control the first fan to turn off when it is determined to end the increase humidity state; and
repeat (A) to (C) until it is determined to stop cooling the first enclosed space based on the second comparison.

20. A method of adjusting a humidity level, the method comprising:
receiving, by a controller, a first temperature value from a first temperature sensor, wherein the first temperature value is a measure of a first temperature within a first enclosed space;
receiving, by the controller, a first temperature set value for the first enclosed space, wherein the first temperature set value is a desired first temperature value for the first enclosed space;
receiving, by the controller, a first humidity set value for the first enclosed space, wherein the first humidity set value is a desired first humidity level for the first enclosed space;
when it is determined to cool the first enclosed space based on a first comparison between the received first temperature value and the received first temperature set value,
determining, by the controller, a first compressor speed for a first compressor;
determining, by the controller, a first compressor run time for the first compressor;
when it is determined to increase a humidity of the first enclosed space based on the received first humidity set value,
decreasing, by the controller, the first compressor speed relative to the first compressor speed determined for the first compressor;
increasing, by the controller, the first compressor run time relative to the first compressor run time determined for the first compressor;
controlling, by the controller, a first fan on, wherein the first fan is configured to direct air through a first evaporator into the first enclosed space;
(A) controlling, by the controller, a flow of refrigerant from the first compressor through a coil of the first evaporator based on the decreased first compressor speed and the increased first compressor run time;
(B) receiving, by the controller, a next first temperature value from the first temperature sensor;
(C) when it is determined to stop cooling the first enclosed space based on a second comparison between the next first temperature value and the received first temperature set value,
controlling, by the controller, the first compressor to turn off;
determining, by the controller, when to end an increase humidity state; and
controlling, by the controller, the first fan to turn off when it is determined to end the increase humidity state; and
repeating, by the controller, (A) to (C) until it is determined to stop cooling the first enclosed space based on the second comparison.

* * * * *